US005541747A

United States Patent [19]

Nishi et al.

[11] Patent Number: 5,541,747

[45] Date of Patent: Jul. 30, 1996

[54] ELECTRO-OPTICAL DEVICE UTILIZING A LIQUID CRYSTAL HAVING A SPONTANEOUS POLARIZATION

[75] Inventors: Takeshi Nishi; Toshimitsu Konuma; Akira Sugawara, all of Kanagawa, Japan

[73] Assignee: Semiconductor Energy Laboratory Co., Ltd., Atsugi, Japan

[21] Appl. No.: 153,901

[22] Filed: Nov. 17, 1993

[30] Foreign Application Priority Data

Nov. 19, 1992 [JP] Japan .................................... 4-333604
Nov. 19, 1992 [JP] Japan .................................... 4-333605

[51] Int. Cl.[6] .................................................. G02F 1/1343

[52] U.S. Cl. .................................................................. 359/56

[58] Field of Search .................................. 359/56; 345/47

[56] References Cited

U.S. PATENT DOCUMENTS 4,840,462 6/1989 Hartmann ................................ 350/350
4,978,203 12/1990 Yamazaki et al. ........................ 359/56
4,995,706 2/1991 Inujima et al. ........................... 359/56
5,251,050 10/1993 Kurematsu et al. ...................... 359/56
5,321,533 6/1994 Kumar ...................................... 359/51

FOREIGN PATENT DOCUMENTS 0525675 2/1993 European Pat. Off. ................. 359/56
2179609 7/1990 Japan ....................................... 359/56

*Primary Examiner*—Anita Pellman Gross
*Assistant Examiner*—James Dudek
*Attorney, Agent, or Firm*—Sixbey, Friedman, Leedom & Ferguson, P.C.; Gerald J. Ferguson, Jr.; Eric J. Robinson

[57] ABSTRACT

A high-performance liquid crystal display includes a pair of substrates and a liquid crystal cell containing a ferroelectric or antiferroelectric liquid crystal. TFTs or a ferroelectric thin film is formed on one substrate. A given amount of electric charge is supplied into the liquid crystal inside the pixel electrodes. After the supply, the charge is retained under a high-resistivity condition. The ratio of the area of parts of the liquid crystal material in a first state to the area of parts in a second state is controlled by the amount of electric charge supplied, thus achieving a wide gray scale. The fast response and the wide viewing angle intrinsic in the liquid crystal are fully exploited. Further, a liquid crystal display using a liquid crystal material consisting either of a liquid crystal material showing ferroelectricity or anfiferroelectricity or of a high polymer in which such a liquid crystal material is dispersed is disclosed. The liquid crystal material is so selected that it shows appropriate spontaneous polarization. The time for which an electric field is applied to the liquid crystal material is controlled to obtain a gray scale.

10 Claims, 22 Drawing Sheets

Fig. Contrast ratio of FLC cell by digital gray scale.

ELECTRO-OPTICAL DEVICE UTILIZING A LIQUID CRYSTAL HAVING A SPONTANEOUS POLARIZATION

FIELD OF THE INVENTION

The present invention relates to a liquid crystal electrooptical device and, more particularly, to a liquid crystal electro-optical device which comprises a ferroelectric or antiferroelectric liquid crystal material having spontaneous polarization and elements disposed on a substrate to supply a given amount of electric charge to the liquid crystal material and to assist the liquid crystal material in switching between different states, for realizing a liquid crystal display producing numerous gray levels. The invention also relates to a liquid crystal electro-optical device which uses thin-film transistors (TFTs) as driving switching elements and employs a fast-response ferroelectric or antiferroelectric liquid crystal, or a fast-response polymer dispersed liquid crystal comprising a high polymer in which a ferroelectric or antiferroelectric liquid crystal is dispersed. More particularly, the invention relates to a liquid crystal electro-optical device which accomplishes so-called fully digitized gray scale including halftones and intermediate gray levels without the need to apply any analog signal to active elements from the outside.

BACKGROUND OF THE INVENTION

Application of electronic devices using liquid crystals is not limited to watches, clocks, thermometers, and other similar devices. It is expected that such electronic devices find wider applications including word processors, laptop computers, and even TV receivers.

Various kinds of liquid crystals are available. Among others, nematic liquid crystals have enjoyed wide acceptance. By contriving the mode of operation, these nematic liquid crystals are used as twisted nematic liquid crystals and supertwisted liquid crystals all of which find extensive application. Such a liquid crystal alone is held between a pair of substrates having a patterned electrode and used as a simple matrix panel. A comparatively small number of steps are needed to manufacture the panel. Also, this panel is economical to manufacture. However, where the number of pixel electrodes is large, crosstalk occurs, thus deteriorating the quality of the displayed image.

To solve this problem, nonlinear devices have been fabricated on substrates from thin-film transistors or metal-insulator film-metal structure at the sacrifice of simplicity of manufacturing process.

These help liquid crystal to switch between different states. As a result, a good-quality picture can be created. Also, clear TV images can be accomplished by liquid crystal panels. However, in the case of nematic liquid crystals, the response speeds are 1 to 500 msec. Their writing speeds are low. Accordingly, ferroelectric and antiferroelectric liquid crystals have attracted attention.

Referring to FIG. 1, liquid crystal molecules 102 of a ferroelectric liquid crystal are oriented in a given direction by the surface of a substrate 100. A layered structure 101 is formed between any adjacent ones of the liquid crystal molecules. These layered structures are arranged highly orderly in three dimensions. It is considered that where the cell is thick, liquid crystal molecules can lie in any positions where cones are formed. They are spirally arranged.

Referring again to FIG. 1, where the cell is thin, the direction of the long axis of each liquid crystal molecule assumes both a first state 102 and a second state 103. The spontaneous polarization of the liquid crystal molecule can be controlled by the direction of an electric field applied to the molecule.

In the first state, the spontaneous polarization is directed downward. In the second state, the spontaneous polarization is directed upward. The spontaneous polarization can be switched between these two states at a high speed. The present state can be maintained stably after cease of the application of the electric field. When observed via a polarizer, the two states can be distinguished over a wide range of viewing angles. Since ferroelectric liquid crystals have excellent features in this way, it is much expected that they act as liquid crystal materials capable of realizing high-speed viewing screens of large capacity. Referring next to FIG. 2, with respect to antiferroelectric liquid crystals, the direction of the long axis of each liquid crystal molecule assumes a first state 120 and a second state 121 in the same way as the aforementioned ferroelectric liquid crystals. In addition, the direction of the long axis of each antiferroelectric liquid crystal molecule can take a third state 122. When no voltage is applied, the third state is assumed. When a negative voltage is applied, the first state is taken up. When a positive voltage is applied, the second state is assumed.

A clear threshold voltage exists between the third and the first states. Also, a clear threshold voltage exists between the third and second states. The presence of these threshold voltages makes it much more easier to drive antiferroelectric liquid crystals than ferroelectric liquid crystals.

The speeds at which the liquid crystal is switched from the third to first state and from the third to second state are increased with increasing the applied voltage. However, the speeds at which the state is switched from the first to third state and from the second to third state tend to decrease somewhat possibly because the viscosity of the liquid crystal and the interfaces affect the switching action relatively greatly and because a sufficient force to change the directions of spontaneous polarizations from a uniform direction to alternating directions does not exist.

All of these characteristics of antiferroelectric liquid crystals are similar to the characteristics of nematic liquid crystals rather than those of ferroelectric liquid crystals.

Both ferroelectric liquid crystals and antiferroelectric crystals form layered structures. These layers are not perpendicular to the substrate surfaces but bent to some extent and form a V-shaped structure. Where such a layered structure is normal to the substrate surface, it is referred to as the bookshelf structure. Where the structure is bent, it is referred to as the chevron structure. Since the layers can be bent in two directions, a defect is created at the interface between two adjacent layers bent in different directions.

A liquid crystal cell can be easily observed with a polarization microscope. This defect deteriorates the capability to retain information and the contrast ratio, which in turn makes it impossible to display a good-quality image. One method of solving this problem is to use an orientation film of a high pretilt angle so that a uniform bending direction is obtained. Another method is to use a liquid crystal material which maintains the layers vertical to the substrate surfaces. A further method is to apply an electric field, for changing the chevron structure to the bookshelf structure. All of these are difficult techniques, and it is difficult to suppress defects.

However, in the case of an antiferroelectric liquid crystal, layers are easily deformed by an electric field. The layers bent like the letter "V" are made vertical to the substrate surfaces. Consequently, good orientation free of defects can be accomplished. An antiferroelectric liquid crystal itself has a threshold value. In addition, it can be oriented well. Hence, antiferroelectric liquid crystals can be handled with greater ease than ferroelectric liquid crystals.

In this way, ferroelectric and antiferroelectric liquid crystals have similar characteristics and different characteristics. In both kinds of liquid crystals, two states are uniquely determined and so it is difficult to change the gray level by the applied voltage unlike in the case of a twisted nematic liquid crystal. Thus, it has been considered that it is difficult to produce various gray levels from ferroelectric and antiferroelectric liquid crystals.

As a result, neither ferroelectric liquid crystals nor antiferroelectric liquid crystals have been used in displays which have high switching speeds and wide viewing angles and still require a wide gray scale such as a TV screen. Accordingly, there is an urgent demand for techniques capable of fabrication of displays using a ferroelectric or antiferroelectric liquid crystal and achieving a wide gray scale.

The typical waveforms of pulse signals used to drive an actual ferroelectric liquid crystal and the response of the liquid crystal are now described by referring to FIG. 3. This ferroelectric liquid crystal is driven by a simple matrix consisting of plural electrodes. One of the pulse signals is a select pulse 131 having a large voltage for selecting the state of the liquid crystal. The other is a non-select pulse 132 having a voltage that is one third or one fourth of the voltage of the select pulse 131.

The liquid crystal is optically switched from a bright state 133 (e.g., a first state) to a dark state 134 (a second state) in response to the select pulse. Then, the liquid crystal responds to the non-select pulse. It is unlikely that the liquid crystal goes back to the first state from the second state. However, optical fluctuations take place. This is a major cause of a decrease in the contrast ratio.

Under this condition, it is impossible to maintain an intermediate state between the first and second states even if the pulse height of the select pulses is changed, for the following reason. Positive and negative voltages are alternately applied to pixel electrodes and so the amount of electric charge is not kept constant but rather varies constantly. Hence, the optical response is not stable.

Where the simple matrix is driven in this way, the problem is whether liquid crystal molecules can certainly assume first and second states and whether a high-contrast ratio state can be obtained. It has been impossible to achieve a gray scale stably.

Accordingly, where a ferroelectric liquid crystal is driven with a simple matrix to produce a gray scale, most techniques take plural (n) pixels as a single picture element displayed on the display device. Various gray levels are created by producing various ratios of the area of ON pixels to the area of OFF pixels. This area ratio gray scale scheme can produce $2^n$ gray levels. However, in order to provide a given area of display, the number of pixels on the display device is required to be n times as many as the number of pixels conventionally required. Furthermore, the display creates a rough picture and, therefore, it is impossible to create a high-resolution picture. In this way, in order to accomplish a higher-resolution display, it is necessary to realize plural gray levels within each one electrode pixel.

The transmittance and the refractive index of a liquid crystal material are affected by an external electric field. By making use of this property, an electrical signal can be converted into an optical signal. In consequence, a display can be provided. Known liquid crystal materials are twisted-nematic (TN) liquid crystals, supertwisted-nematic (STN) liquid crystals, ferroelectric liquid crystals, and antiferroelectric liquid crystals. In recent years, polymer dispersed liquid crystals (PDLC) comprising high polymers in which nematic, ferroelectric, or antiferroelectric liquid crystals are dispersed have come to be known. It is known that a liquid crystal does not respond to an external voltage in an infinitely short time but rather a given time passes until the liquid crystal responds to the voltage. The time is intrinsic to each individual liquid crystal material. The time is tens of milliseconds for twisted-nematic liquid crystals, hundreds of milliseconds for supertwisted-nematic liquid crystals, tens of microseconds for ferroelectric liquid crystals, and tens of milliseconds for polymer dispersed liquid crystals utilizing nematic liquid crystals.

Of display devices making use of liquid crystals, those devices which use the active-matrix structure produce the best image quality. Conventional liquid crystal electro-optical devices of the active-matrix type use thin-film transistors (TFTs) as active devices. The TFTs are fabricated from an amorphous or polycrystalline semiconductor. TFTs of only one type, or either P- or N-type, are used for each one pixel. In particular, N-channel TFTs (NTFTs) are connected in series with each one pixel. Signal voltages are applied to signal lines arranged in rows and columns. When both vertical and horizontal signal voltages are applied to a TFT located at the junction of a horizontal signal line and a vertical signal line, the TFT is activated. In this way, individual liquid crystal pixels are separately activated and deactivated. A liquid crystal electrooptical device showing a large contrast can be accomplished by controlling pixels in this manner.

However, it has been very difficult for the prior art active-matrix type to create a gray scale including halftones or color tones. A method utilizing the fact that the transmittance of a liquid crystal varies according to the applied voltage has been discussed to realize a gray scale. More specifically, an appropriate voltage is applied between the source and drain of each one of TFTs arranged in rows and columns from a peripheral circuit. Under this condition, a signal voltage is applied to the gate electrode to apply the same voltage to the corresponding liquid crystal pixel.

In this method, voltages actually applied to liquid crystal pixels differ by at least several percent because the TFTs or matrix lines are not homogeneous. On the other hand, the dependence of the transmittance of a liquid crystal on the voltage shows quite strong nonlinearity, and:the transmittance varies rapidly at a given voltage. Therefore, even if two pixel voltages differ by only a few percent, their transmittances may differ greatly. For this reason, the prior art analog gray scale display method can achieve only 16 gray levels at best. For example, in a TN liquid crystal material, a transitional region where the transmittance varies has a width of only 1.2 V. To attain 16 gray levels, it is necessary to control a quite small voltage of 75 mV. This has reduced the production yield greatly.

The aforementioned difficulty in realizing a gray scale display has made liquid crystal displays much less competitive than conventional CRTs which have enjoyed wide acceptance. We have found that a gray scale can be obtained visually by controlling the time for which a voltage is applied to a liquid crystal. This technique is described in detail in Japanese Patent application Ser. No. 169306/1991.

For example, where a twisted-nematic liquid crystal which is a typical liquid crystal material is used, brightness can be varied by applying various pulse waveforms to liquid crystal pixels, as shown in FIG. 11. That is, the brightness can be increased in a stepwise fashion in the order 1, 2, . . . , 15 shown in FIG. 11. In the example of FIG. 11, an image can be displayed at 16 gray levels. For instance, in FIG. 11(A), a pulse having a duration of 1 unit is applied at gray level 1. A pulse having a duration of 2 units is applied at gray level 2. A pulse having a duration of 2 units and a pulse having a duration of 1 unit are applied at gray level 3. As a result, a pulse having a duration of three units is applied. A pulse having a duration of 4 units is applied at gray level 4. A pulse having a duration of 1 unit and a pulse having a duration of 4 units are applied at gray level 5. A pulse having a duration of 2 units and a pulse having a duration of 4 units are applied at gray level 8. Furthermore, a pulse having a duration of 8 units is prepared. As a result, a pulse having a duration of 15 units can be obtained.

Specifically, $2^4=16$ gray levels can be produced by appropriately combining 4 kinds of pulses, i.e., pulses having durations of 1 unit, 2 units, 4 units, and 8 units, respectively. If more kinds of pulses such as pulses having durations of 16 units, 32 units, 84 units, and 128 units, respectively, are prepared, then a gray scale having more gray levels such as 32 gray levels, 64 gray levels, 128 gray levels, and 256 gray levels, can be derived. For example, in order to obtain 256 gray levels, 8 kinds of pulses should be prepared.

In the example of FIG. 11(A), the duration of the voltage applied to each pixel increases in geometrical series, such as $T_1$, $2T_1$, $4T_1$, and so forth. The duration may also be varied from $T_1$ to $8T_1$ and then to $2T_1$ and finally to $4T_1$, as shown in FIG. 11(B). This arrangement can reduce the burden imposed on a unit which transfers data to a display unit.

However, where a TN liquid crystal is used, the accuracy of the voltage applied must be as high as the accuracy of the prior art analog gray scale display method. Specifically, when "10" shown in FIG. 11 is displayed by applying 5 V to a pixel to activate it, the obtained brightness is darker by about 2% than the brightness obtained by applying 5.1 V to activate the pixel so as to display the same "10". That is, in this digital gray scale display method, TFTs are required to have uniform characteristics in the same way as the prior art analog gray scale display method.

FIG. 13(A) is a circuit diagram of a typical TFT active-matrix circuit. Variations in the potential $V_1$ on a liquid crystal pixel caused by applying a scanning signal $V_G$ and a data signal $V_D$ are shown in FIG. 13(B).

Some factors contribute to the variations in the potential $V_1$. A major factor is a potential drop V produced when the scanning signal is interrupted due to parasitic capacitances on the gate electrode of each TFT and on leads extending from the pixel electrode. Another major factor is a voltage drop caused by a leakage current from the TFT and by a leakage current from the liquid crystal. Where TFTs cannot be driven sufficiently, i.e., the mobility is small, if a sufficient electrical charging cannot be done during a time $t_1$ for which the scanning signal persists, then the reached voltage becomes nonuniform, thus causing the above-described variations.

These variations are affected materially by the characteristics of TFTs and so if the TFTs differ widely in characteristics, then individual pixels differ greatly in brightness. For instance, if the parasitic capacitances on the gate electrodes and the parasitic capacitances on the leads extending from the pixel electrodes are not uniform, then the voltage drops $\Delta V$ differ. If the leakage currents from the TFTs differ, then pixel voltages decrease at various speeds. In the case of TFTs having a low mobility such as amorphous silicon TFTs, nonuniform electrical charging also presents problems. For these reasons, even if the same signal is applied, the pixel potential $V_1$ may show either a characteristic curve as indicated by the solid line in FIG. 13(B) or a characteristic curve as indicated by the broken line. Of course, such variations in characteristics are not desirable.

SUMMARY OF THE INVENTION

We have taken notice of the mechanism of generating spontaneous polarization of a ferroelectric liquid crystal and made a thorough investigation of the optical response of the liquid crystal to the waveform of the driving signal, as well as of the resulting spontaneous polarization. As a result, we have found that movement of electric charge into and out of a ferroelectric liquid crystal is important for a gray scale created by the liquid crystal.

It is an object of the present invention to provide a method of producing plural gray levels with a single pixel electrode.

It is another object of the invention to provide a method of creating a gray scale by a ferroelectric or antiferroelectric liquid crystal, using elements capable of supplying a given amount of electric charge to the liquid crystal.

This object is achieved by a liquid crystal electro-optical device which is fabricated in the manner described now. First, a liquid crystal material having spontaneous polarization is sandwiched between a pair of substrates which transmit light. Lead electrodes are formed on one of the substrates, while pixel electrodes are formed on the other. Means are provided on the surfaces of the substrates in contact with the liquid crystal material to orient the molecules of the liquid crystal material along one axis at least at initial stage. Means for supplying electric charge to the pixel electrodes are provided. The amount of electric charge supplied to each pixel electrode is more than twice of the product of the spontaneous polarization of the liquid crystal material itself and the pixel area. The amount of charge is retained until the next supply of electric charge. In this way, the liquid crystal material of the liquid crystal electro-optical device is controllably switched between first and second states.

In another aspect of the invention, a liquid crystal material having spontaneous polarization is sandwiched between transparent substrates which have lead electrodes and pixel electrodes, respectively. Means are provided on the surfaces of the substrates in contact with the liquid crystal material to orient the molecules of the liquid crystal material along one axis at least at initial stage. Means for supplying electric charge to the pixel electrodes are provided. An arbitrary amount of electric charge is supplied to the pixel electrodes. This amount is less than the twice of the product Of the spontaneous polarization of the liquid crystal material itself and the pixel area. The amount of charge is maintained until the next supply of electric charge. The liquid crystal can assume either a first state or a second state. The ratio of the area of portions in the first state to the area of portions in the second state is varied to produce various gray levels.

In a further aspect of the invention, a liquid crystal material having spontaneous polarization is sandwiched between transparent substrates which have lead electrodes and pixel electrodes, respectively. Means are provided on the surfaces of the substrates in contact with the liquid crystal material to orient the molecules of the liquid crystal material along one axis at least at initial stage. An arbitrary amount of electric charge is supplied to the pixel electrodes.

This amount is less than the twice of the product of the spontaneous polarization of the liquid crystal material itself and the pixel area. The amount of charge is maintained until the next supply of electric charge. An amount of spontaneous polarization corresponding to the supplied electric charge is inverted to maintain a semi-equilibrium state between the supplied electric charge and the spontaneous polarization charge inside the pixel electrodes. The ratio of the area of portions in the first state to the area of portions in the second state is varied to produce various gray levels.

In these aspects, the directions of the molecules of the liquid crystal material are previously aligned in one direction by supplying electric charge in the opposite direction before supplying a given amount of electric charge. This is necessary to maintain the optical variation of the liquid crystal constant against the given amount of electric charge supplied.

As parts of the means for supplying electric charge, thin film transistors (TFTs) are used. In one feature of the invention, capacitors are connected in parallel with pixel electrodes connected with the TFTs. This is quite effective in driving the liquid crystal material having spontaneous polarization as in the present invention.

Also, as parts of the means for supplying electric charge, diode devices or ferroelectric thin-films can be employed.

These features are necessary to create a gray scale from a liquid crystal material having spontaneous polarization according to the present invention. When pixels are selected for a given time, the devices capable of supplying electric charge can supply a given amount of electric charge to the pixels such as TFTs or ferroelectric thin films.

Of course, the electric charge supplied to the liquid crystal cell should not be consumed inside the cell. For this purpose, the volume resistivity is required to be in excess of $10^{11}$ Ω.cm. Cells which permit passage of current other than current produced by spontaneous polarization induced by application of an electric field are not desirable.

Other objects and features of the invention will appear in the course of the description thereof, which

DETAILED DESCRIPTION OF THE INVENTION

When a liquid crystal material having spontaneous polarization is switched between different states, electric charge flows in the manner described now. Electric charge is supplied to pixel electrodes by various means. Because of the relation with the pixel capacitance, a constant voltage is applied to the pixel electrodes.

Since a twisted nematic (TN) liquid crystal has a clear threshold voltage value, if a voltage less than the threshold voltage value is applied to the liquid crystal, it does not respond. When a voltage exceeding the threshold voltage value is applied, the state is gradually varied and the tone changes. That is, by adjusting the applied voltage, the liquid crystal can be changed from a transmissive state to a non-transmissive state.

On the other hand, a ferroelectric liquid crystal does not has such a threshold voltage value. When a large voltage is applied, the liquid crystal quickly varies from a first state to a second state. When a small voltage is applied, a state change occurs though in a long time. Therefore, it cannot be simply said that the liquid crystal responds or does not respond to a given voltage applied.

In the case of a ferroelectric liquid crystal, it has spontaneous polarization in itself and so how an amount of electric charge supplied from the outside inverts the spontaneous polarization is a problem. What is important is not the applied voltage but the amount of electric charge supplied. Theoretically, the liquid crystal changes totally from its first state to its second state by supplying an amount of electric charge which is twice of the product of the spontaneous polarization (amount of electric charge per unit area) of the liquid crystal material itself and the pixel area. In practice, it is necessary that electric charge several times (1 to 5 times) as much as the above-described value be supplied because even a ferroelectric liquid crystal has a threshold voltage though it is unclear. When the amount of electric charge supplied from the outside is less than the aforementioned amount, it is impossible to fully invert the spontaneous polarization inside each pixel electrode. Rather, an inversion corresponding to the supplied electric charge takes place. Also, optical characteristics responds to the supplied electric charge, and an inversion of the optical characteristics partially takes place. That is, a gray scale is realized.

In this way, the mechanism of application of a voltage to the liquid crystal is the same as the mechanism of supply of electric charge. However, how electric charge for inverting the spontaneous polarization of the liquid crystal is supplied becomes a problem. This is a more appropriate expression than an expression using a voltage.

Figure 1:
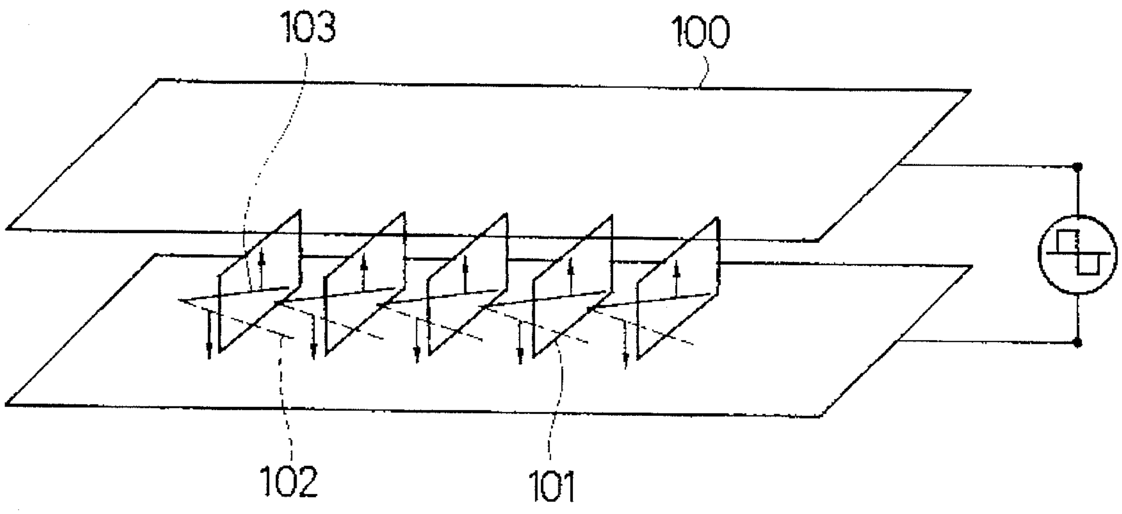
FIG. 1 is a conceptual diagram of a ferroelectric liquid crystal.
Figure 2:
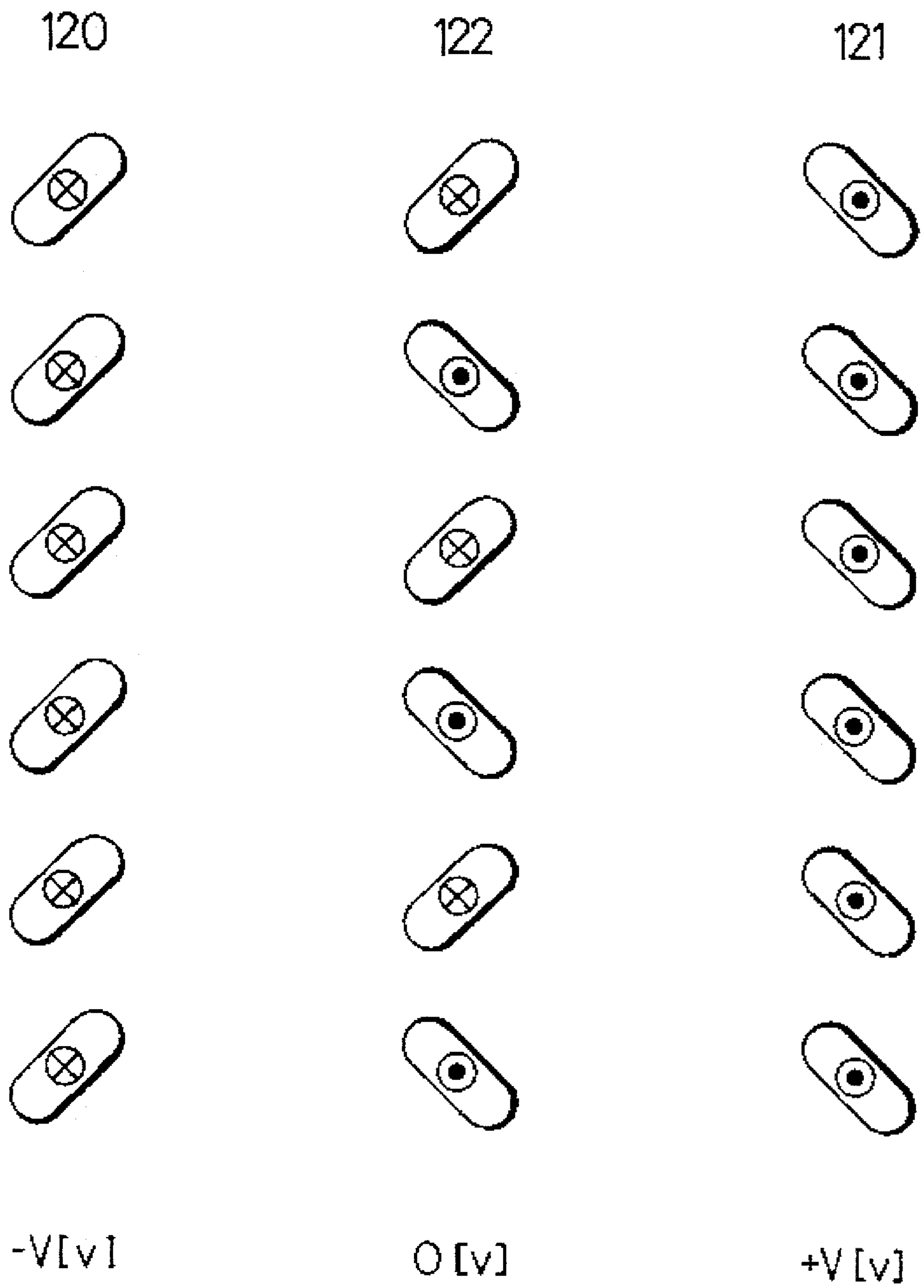
FIG. 2 is a diagram illustrating the direction of the long axis of each molecule of an antiferroelectric liquid crystal.
Figure 3:
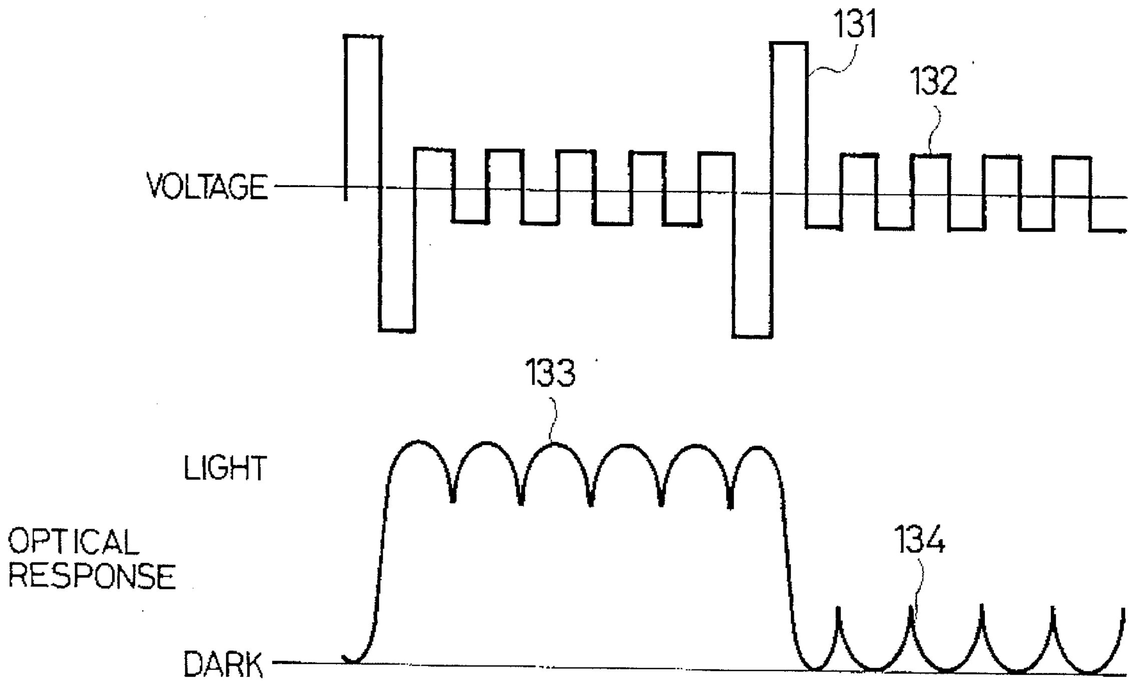
FIG. 3 PRIOR ART
FIG. 3 is a diagram illustrating a method of driving a ferroelectric liquid crystal by the prior art method.
Figure 4:
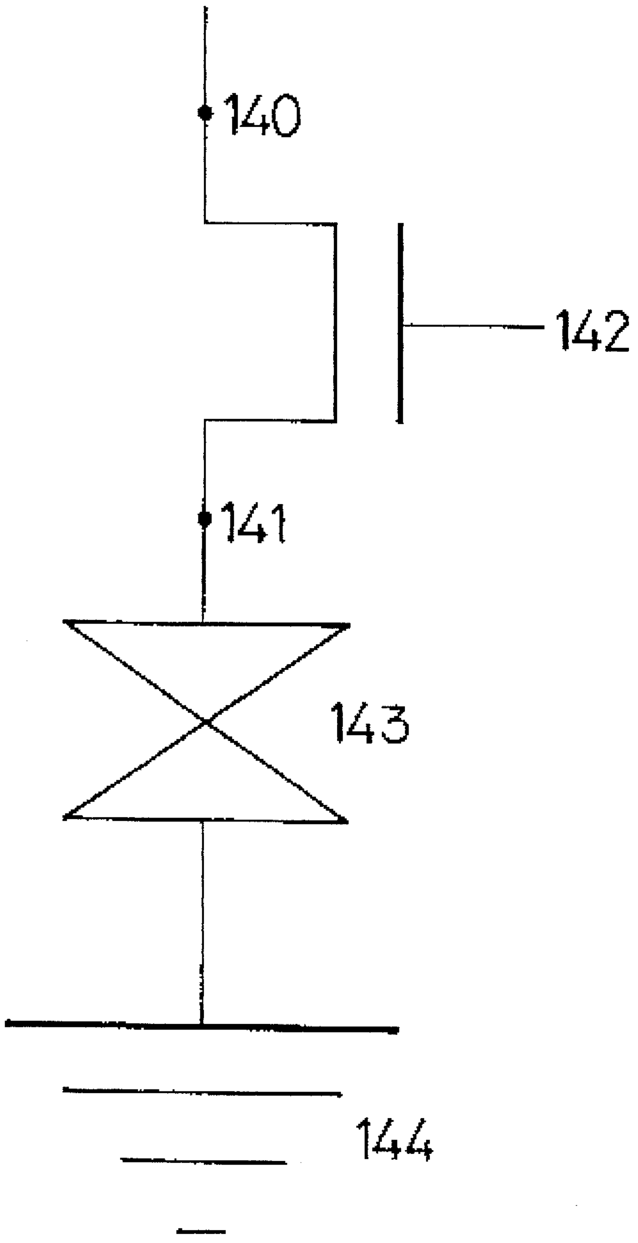
FIG. 4 is a circuit diagram of a part of a liquid crystal electro-optical device according to the present invention.

A thin film transistor (TFT) is used as a charge supply means in the manner described below. Referring to FIG. 4, this TFT comprises a source 140 for supplying a signal, a drain 141 connected with a liquid crystal pixel 143, and a gate 142 for controlling the potential difference between the source and the drain. The other end of the pixel electrode is usually grounded at 144. During operation of the TFT, a given voltage is applied to the source.

Under this condition, a voltage is applied to the gate, thus turning on the transistor. The resistance between the source and the drain decreases. A given electric charge is supplied to the pixel electrode connected with the drain. After the supply of the charge, the gate assumes OFF state. The resistance between the source and the drain is 4 to 8 orders of magnitude as high as the resistance in the 0N state. The pixel electrode takes a substantially open state. The potential remains unchanged.

Figure 5:
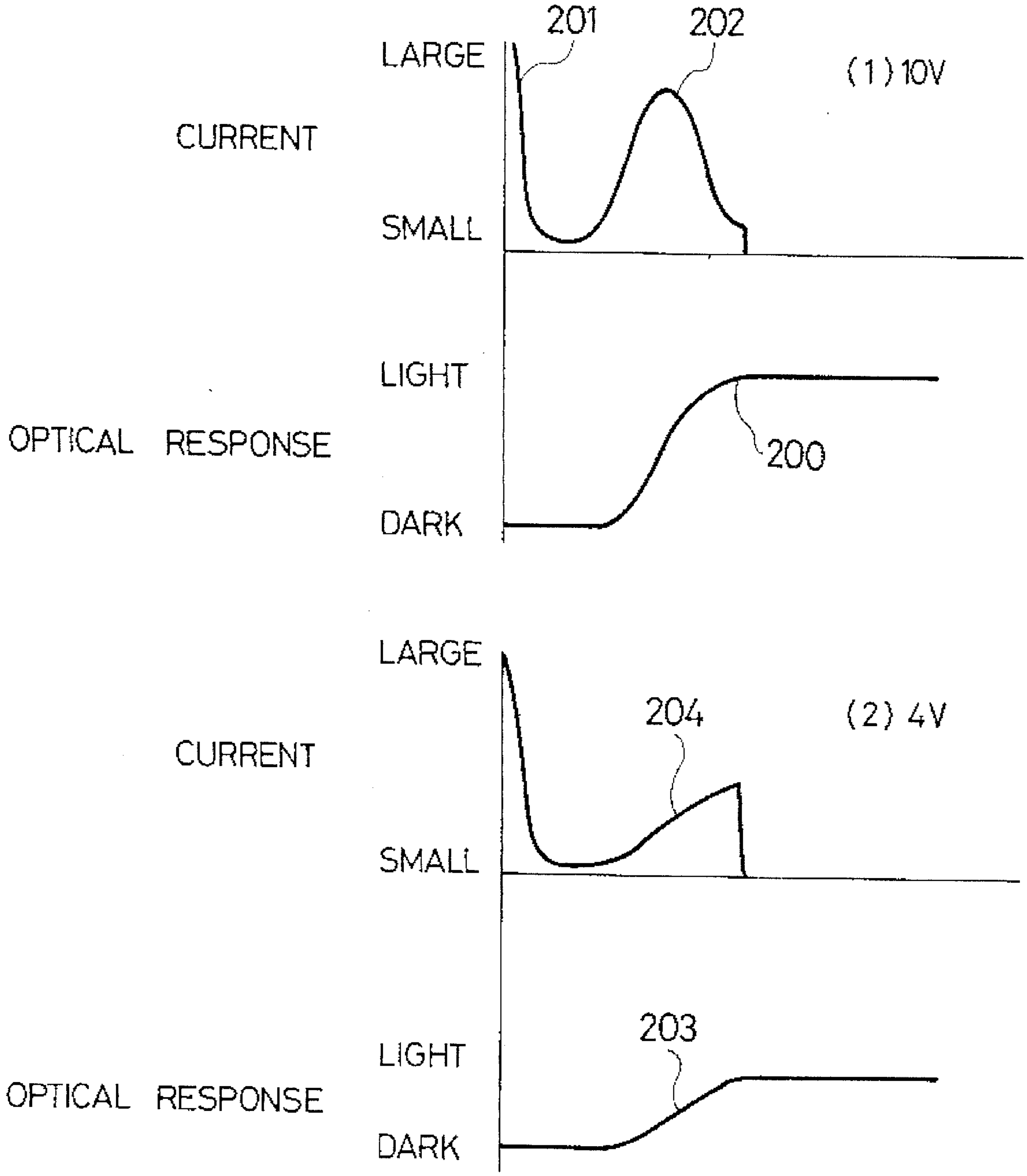
FIG. 5 is a diagram illustrating the operation of the liquid crystal electro-optical device shown in FIG. 4.

A ferroelectric liquid crystal is activated via the TFT in the manner described now. Referring to FIG. 5, the gate is kept in ON state for 60 μs. During this time interval, electric charge is supplied to the liquid crystal.

We have examined the relation between the electric current flowing through the system and the optical response. When a voltage of 10 V is applied, optical response 200 of the liquid crystal is totally inverted from a first state to a second state. At the initial stage, electric charge 201 is injected into the pixel electrode. A large electric current 202 flows in response to the optical change. The large current 202 is induced by the inversion of the spontaneous polarization of the ferroelectric liquid crystal.

When the applied voltage is 4 V, the injection of electric charge ends before the optical response 203 of the liquid crystal varies sufficiently. Concomitantly, optical response 204 ends. Subsequently, an optically constant state is maintained. With respect to electrical current, the current induced by inversion of spontaneous polarization ceases in its intermediate state. That is, the liquid crystal is not wholly inverted at this voltage and during this time interval; rather the inversion ends during the course of the inversion.

With respect to the state of the optical response, the cease of the supply of electric charge is maintained even after the gate is turned off. In other words, the amount of electric charge injected at this time is not sufficient to invert the liquid crystal totally. The electric charge inverts a part of the liquid crystal. This is quite important for the present invention.

The optical response of the liquid crystal produces both OFF state and ON state when the applied voltage is large. It can be seen that the angle of cone obtained at this time is the same as the angle of cone obtained when a DC voltage is applied and that the liquid crystal sufficiently responds. In a low-voltage region, the optical response changes while the gate is ON but the liquid crystal cannot respond sufficiently during this time interval. Hence, the above-described sufficient optical position is not reached but an intermediate state is assumed. This state is maintained after the gate is turned off. As a result, a stable intermediate state is derived.

Figure 8:
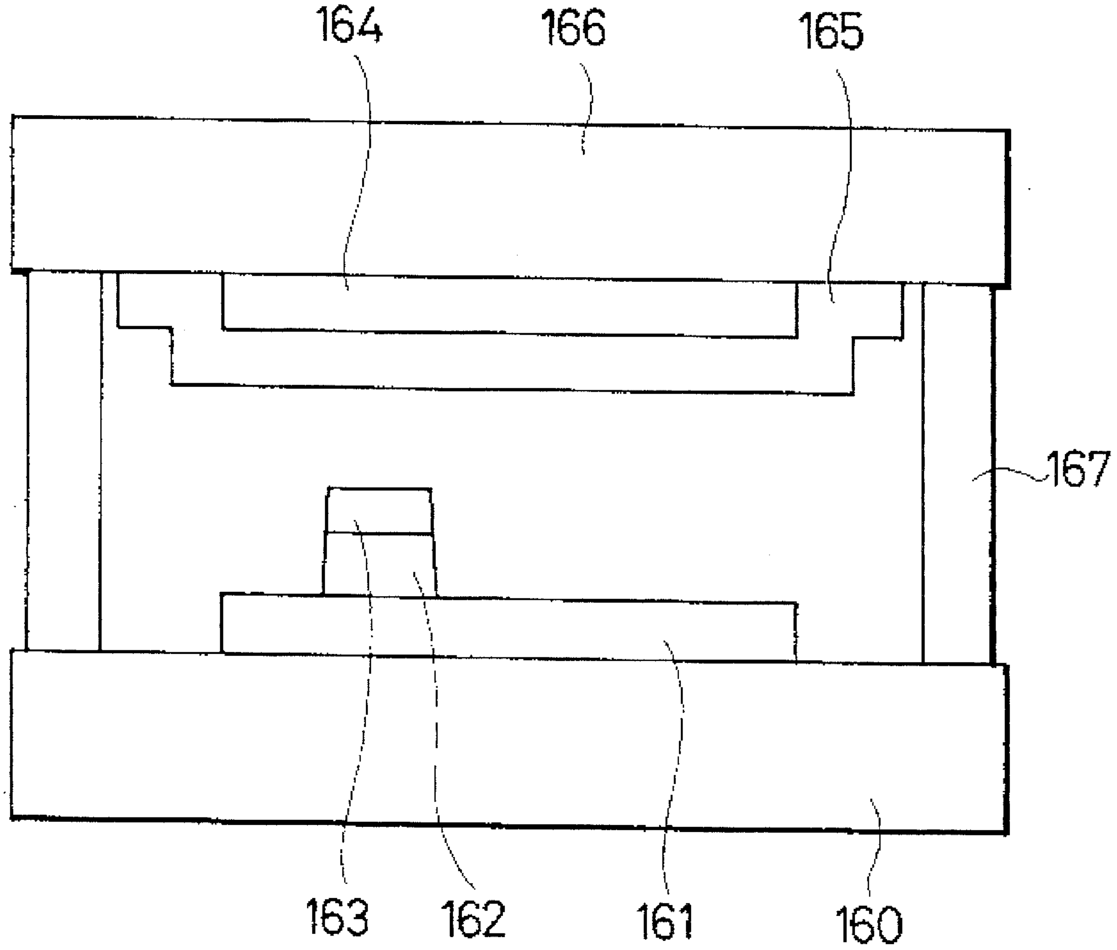
FIG. 8 is a cross-sectional view of the liquid crystal electro-optical device shown in FIG. 7.

Variations of the optical response when the voltage applied to a pixel electrode is changed during ON state of the gate are shown in FIG. 8. When the applied voltage is varied, the amount of light transmitted through the pixel varies continuously. Thus, this region presents almost no problem in connection with gray scale display provided by a ferroelectric liquid crystal.

Figure 6:
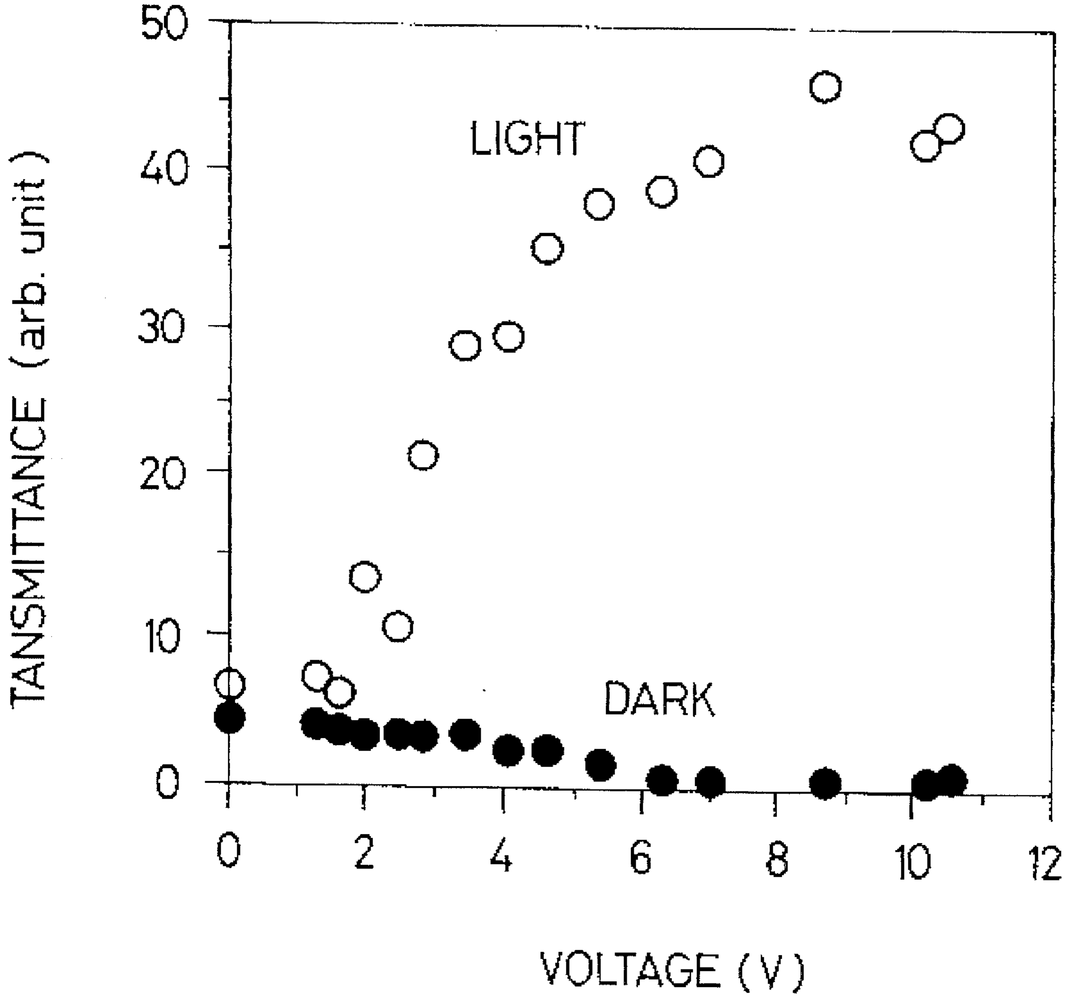
FIG. 6 is a graph illustrating the operation of the liquid crystal electro-optical device shown in FIG. 4.

When a liquid crystal to which a voltage less than 5 V as shown in FIG. 6 is applied is observed with an optical microscope, domains where first and second states are mixed are observed. When voltages more than 5 V are applied, no domains are observed. The blackness or whiteness of the whole pixel is varied. We guess that the angle of cone changes at this stage.

In this way, halftones involving domains are created on one side of a given voltage. Halftones involving no domains are created on the other side. As can be seen from FIG. 8, where the applied voltage is lower than 5 V and domains are produced, a wider gray scale can be produced for the applied voltage. In a region of voltages exceeding 5 V, the transmittance varies mildly in practice. Consequently, the method of creating a gray scale by varying the areas of the first and second states, respectively, is actually more prevalent than the method of creating a gray scale by varying blackness and whiteness.

Where a gray scale is created from a ferroelectric liquid crystal, using TFTs, any of the following two methods can be adopted: (1) The peak value of the applied voltage is varied while the gate is kept on during a given time; (2) The time for which the gate is turned on is varied while the applied voltage is maintained constant. These methods pose no problems. 0f course, if the time for which a voltage is applied is long, the liquid crystal sufficiently responds in switching from a first state to a second state. If the time is short, the liquid crystal optically responds insufficiently because of the degree of inversion of spontaneous polarization.

It is possible to create a gray scale by varying both the applied voltage and the time for which the gate is kept on. At this time, the factor capable of being treated with greater ease is varied in more steps, while the factor having no margin is changed in fewer steps. This method is convenient to activate the liquid crystal in practice. In this case, if the time is varied, it follows that the driving frequency is also varied. Hence, it is practical to control the peak value of the voltage.

It is said that a ferroelectric liquid crystal itself has no sharp threshold value. Certainly when a DC voltage is applied to a ferroelectric liquid crystal cell, the optical response changes although the rate of change is low.

Although it is possible that the response of a ferroelectric liquid crystal driven by pulses has a threshold value, half-tones cannot be stably maintained for the following reason. If a voltage is simply applied to a pixel electrode, electric charge is consumed inside the pixel electrode in response to inversion of liquid crystal molecules. To supplement this, additional electric charge is supplied. In spite of application of a low voltage, the liquid crystal exhibits no threshold value. All liquid crystal molecules are inverted. After a pulse has been applied, the potential inside the pixel electrode is made uniform. As a result, no potential difference is developed.

In this case, therefore, a reverse electric field is produced inside the cell. This field varies the state after application of a voltage. When a given amount of electric charge is supplied from a TFT within a given time, only that amount of spontaneous polarization which corresponds to the amount of electric charge responds. In a later open state, the state which can be assumed by the liquid crystal is maintained. That is, the amount of the supplied electric charge and spontaneous polarization are in a quasi-equilibrium state (a substantially equilibrium state).

Where electric charge is consumed inside the pixel electrode, or where the liquid crystal has large spontaneous polarization such as an antiferroelectric liquid crystal and it is impossible to inject an amount of electric charge sufficient to invert the liquid crystal within a given period, supply of electric charge is necessary to replenish the charge. In this case, the TFT is connected in series with the liquid crystal. In addition, it is better to connect an appropriate amount of capacitance (referred to as the additional capacitance) in parallel with the pixel. The additional capacitance is equal to, or several times as much as, the pixel electrode. If the capacitance is larger, the pixel charge can be sufficiently replenished but it takes too long time to store electric charge in the additional capacitance. In this way, the aforementioned capacitance is appropriate.

As described already, a device for supplying a given amount of electric charge to the pixel electrode is not limited to a TFT. Some other devices can also be used. Where a metal- insulator-metal (MIM) device or a ferroelectric thin film is used as a two-terminal device, such a phenomenon can be utilized. Examples of organic high polymers of ferroelectric thin films include copolymer of polyvinylidene fluoride and trifluoroethylene, copolymer of vinylidene fluoride and trifluoroethylene, and copolymer of vinylidene fluoride and tetrafluoroethylene. Examples of inorganic ferroelectric thin films include barium titanate, titanium oxide, and composite inorganic films.

Figure 7:
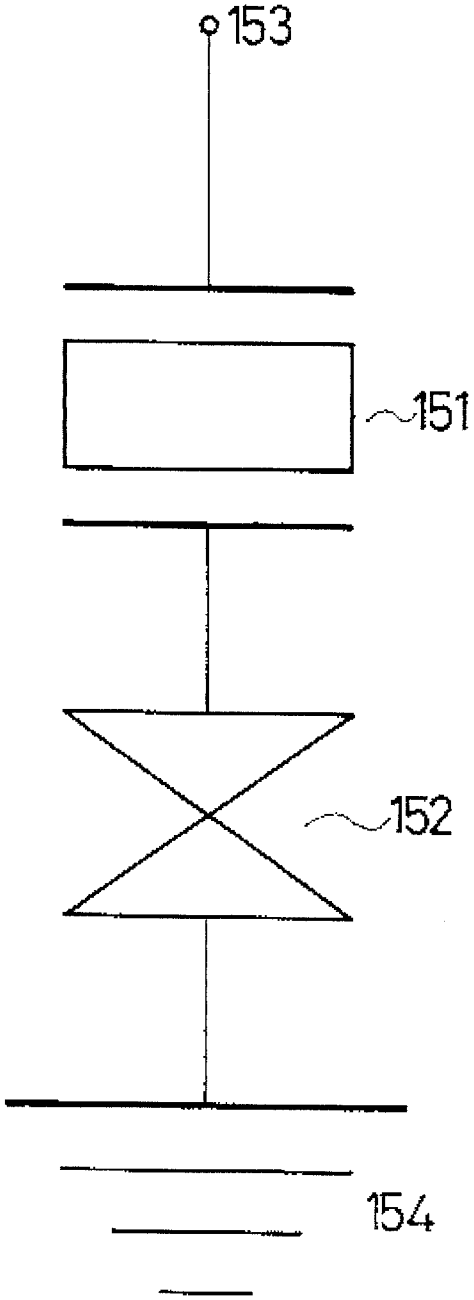
FIG. 7 is a circuit diagram of a part of another liquid crystal electro-optical device according to the present invention, the device using a ferroelectric thin film.

Such a ferroelectric thin film is disposed inside a pixel electrode. When a voltage is applied to the ferroelectric thin film, spontaneous polarization is induced in the same way as in a ferroelectric liquid crystal. This is described in detail by referring to FIG. 7. The ferroelectric thin film, 151, is connected in series with a liquid crystal 152. A signal voltage is applied to one terminal 153 of the pixel electrode. The other terminal 154 of the pixel electrode is grounded. When a signal voltage pulse is applied to the pixel electrode via the terminal 153, the voltage is impressed on both ferroelectric thin film and liquid crystal. Dipoles in the thin film and in the liquid crystal are oriented in a given direction. The magnitude of the spontaneous polarization of the ferroelectric thin film is 1,000 to 100,000 nC/cm$^2$ which is approximately three to five orders of magnitude as large as the spontaneous polarization of the ferroelectric liquid crystal.

Therefore, it would be considered that the behavior of the spontaneous polarization of the ferroelectric thin film dominates this system. When the potential applied after application of pulses become zero, the spontaneous polarization produced from the ferroelectric thin film is also applied to the liquid crystal. That is, when the spontaneous polarization produced by the thin film is divided by both capacitances, electric charge is supplied to the liquid crystal.

Although spontaneous polarization is induced when a voltage is applied to a ferroelectric thin film, if the voltage is small, the magnitude of the spontaneous polarization is almost zero. However, when a certain voltage, or a counter electric field, is exceeded, the spontaneous polarization increases in proportion to the applied voltage. Therefore, the magnitude of the produced spontaneous polarization can be controlled by the applied voltage. Hence, the amount of electric charge supplied to the ferroelectric liquid crystal of the pixel electrode can be controlled. In this manner, the ratio of the portion of the liquid crystal of the pixel electrode in the first state to the portion in the second state can be controlled.

That is, a gray scale can be created from a ferroelectric liquid crystal. Also, the voltage applied to the ferroelectric thin film can be varied, in the same way as in the case of a TFT. It is also possible to vary the time for which the voltage is applied while maintaining the voltage constant. Additionally, both voltage and time may be varied. In any case, a method involving a margin is preferably selected.

In this way, the first and second states assumed by the liquid crystal can be controlled by the amount of electric charge supplied to the ferroelectric liquid crystal. Since the liquid crystal itself has no sharp threshold voltage value, the control over a gray scale is not determined until both the initial position and the amount of electric charge are given.

In consequence, the initial state of the liquid crystal must be determined in order to realize a reproducible gray scale. Accordingly, before pulses for supplying electric charge are applied, reverse pulses are applied to initialize the state of the liquid crystal. Thus, the desired state can be realized at the next moment, irrespective of the previous state of the displayed pixel. This will be described in further detail in connection with Examples of the present invention.

As already pointed out, the pixel electrode must be controlled accurately because the transmittance of a TN liquid crystal changes according to the effective voltage value. STN liquid crystals and polymer dispersed liquid crystals using nematic liquid crystals which are fundamental materials of those STN liquid crystals exhibit similar phenomena.

The present invention is intended to solve these drawbacks which occur when a nematic liquid crystal is utilized. In particular, the used liquid crystal material is a ferroelectric liquid crystal, an antiferroelectric liquid crystal, or a polymer dispersed liquid crystal (PDLC) comprising a high polymer in which a ferroelectric or antiferroelectric liquid crystal is dispersed.

Figure 14:
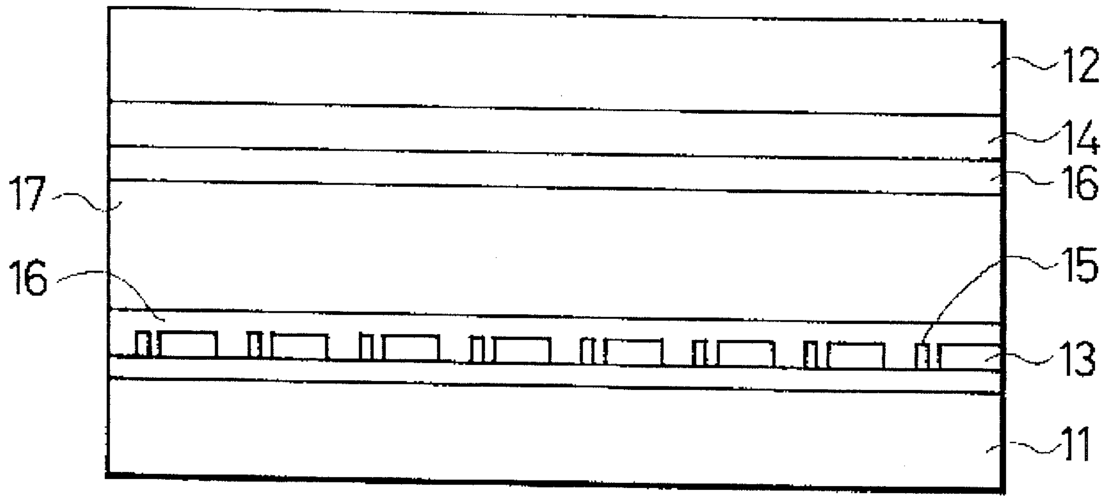
FIG. 14 is a schematic cross section of a further liquid crystal electro-optical device according to the invention.

A liquid crystal electro-optical device according to the present invention is essentially constructed as shown in FIG. 14. This device comprises a pair of substrates 11 and 12 having electrodes 13 and 14, respectively. At least one of the substrates 11 and 12 transmits light. One of the substrates has thin-film transistors 15. At least one of the substrates has an orientation film 16 subjected to one axis orientation treatment such as rubbing or other method. A liquid crystal cell is formed between these two substrates. The orientation films are disposed opposite to each other. A material 17 consisting of a liquid crystal material showing ferroelectricity or antiferroelectricity or of a polymer dispersed liquid crystal (PDLC) comprising a high polymer in which the aforementioned liquid crystal material is dispersed is sandwiched between the substrates in the liquid crystal cell.

In a display device according to the present invention, liquid crystal molecules can be inverted even with a small amount of electric charge. To enable this, a liquid crystal material having a small value of spontaneous polarization is used. The liquid crystal molecules can respond to even pulse widths shorter than the response time of the material 17. As a result, good optical characteristics can be derived.

Also in the present invention, because of short pulse widths, the amount of electric charge is not sufficient compared with the spontaneous polarization of the liquid crystal material itself. Also, electric charge becomes insufficient because of electric discharge. To replenish the electric charge, an auxiliary capacitor is connected in parallel with each switching device. In this case, such auxiliary capacitors are mounted on the substrate having the thin-film transistors.

To enable the novel display device to invert liquid crystal molecules with a small amount of electric charge, the operating temperature is elevated provided that the liquid crystal material has large spontaneous polarization. This lowers the value of the spontaneous polarization. As a result, the liquid crystal molecules can respond even to pulse widths shorter than the response time of the material 17. In this way, good optical characteristics can be obtained.

The required magnitude of the spontaneous polarization of the liquid crystal material is less than 10 $nC/cm^2$, preferably less than 8 $nC/cm^2$. Where auxiliary capacitors are provided, the spontaneous polarization of the liquid crystal material is less than 20 $nC/cm^2$, preferably less than 18 $nC/cm^2$. In addition, the ratio of the pixel capacitance to the auxiliary capacitance is less than 1:10,000.

Of course, where the spontaneous polarization of the liquid crystal is small, and where electric discharge from pixels is sufficiently small, the auxiliary capacitors may be omitted. Especially, the presence of excessive auxiliary capacitance prolongs the charging operation and the discharging operation. This is undesirable in practicing the present invention. In order to reduce electric discharge from pixels, it is necessary to set the OFF resistance of thin-film transistors sufficiently large, thus reducing the leakage current. Furthermore, it is necessary to set large the electrode-electrode resistance of pixels themselves of the liquid crystal. The latter requirement is effectively satisfied by coating pixel electrodes with silicon nitride, silicon oxide, tantalum oxide, aluminum oxide, or other insulating material. Also, increasing the capacitance of each pixel itself is effective in suppressing electric discharge. For this purpose, the dielectric constant of the liquid crystal is increased, or the spacing between the substrates is reduced.

Figure 15:
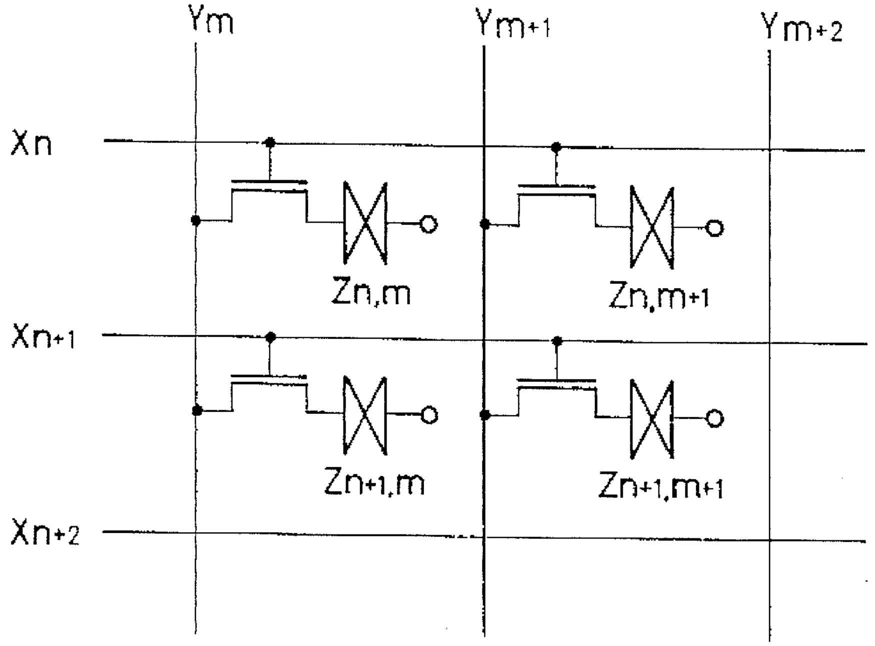
FIG. 15 is a circuit diagram of a part of a matrix structure according to Example I of the present invention.

In order to carry out the present invention, a matrix circuit is built from thin-film transistors (TFTs) as shown in FIG. 15. The circuit shown in FIG. 15 is the same as the circuit used in the prior art active-matrix display using TFTs.

Figure 12:
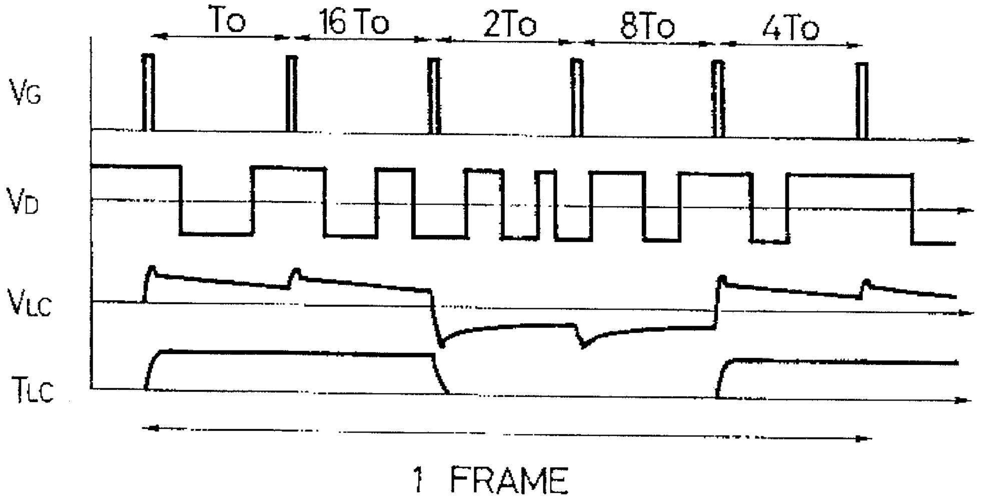
FIG. 12 is a waveform diagram illustrating driving signals used in a liquid crystal electro-optical device according to the invention.

In this circuit, the voltage applied to each individual pixel can be turned on and off by controlling the gate voltage and the source-drain voltage of each TFT. In this example, the matrix is composed of 640×480 dots. To avoid complexity, only n rows and m columns and their vicinities are shown. The complete matrix can be obtained by expanding these n rows and m columns vertically and horizontally. An example of operation of this circuit is illustrated in FIG. 12, where only one pixel is noted.

Signal lines $X_n$, or scanning lines, are connected with the gate electrodes of TFTs. As shown in FIG. 12, rectangular pulse signals are applied to the lines. Signal lines $Y_m$, or data lines, are connected with the sources or drains of the TFTs. A pulse train indicating positive or negative state is applied to each data line. In the case of the matrix comprising 480 rows, this pulse train contains 480 pieces of information per unit time $T_1$. The present invention is characterized in that one frame is composed of plural subframes (5 subframes in the example of FIG. 12). In the example of FIG. 12, these subframes are different in duration.

Figure 13A:
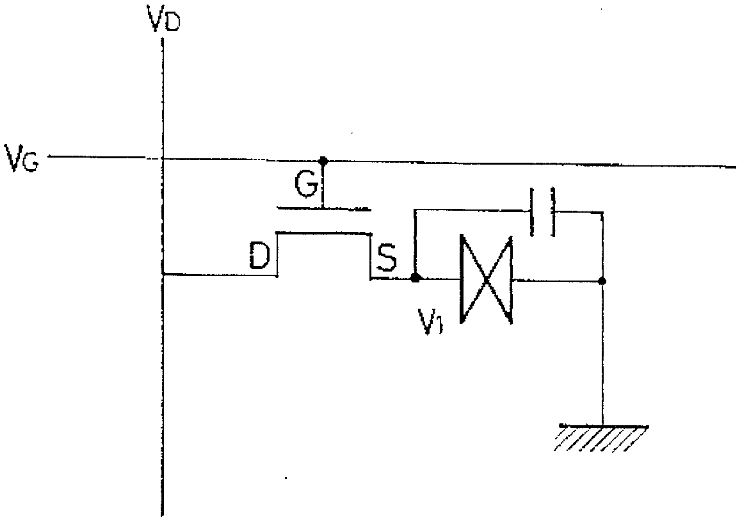
FIG. 13(A) PRIOR ART
FIG. 13(A) is a circuit diagram of a part of the prior art active-matrix circuit.
Figure 13B:
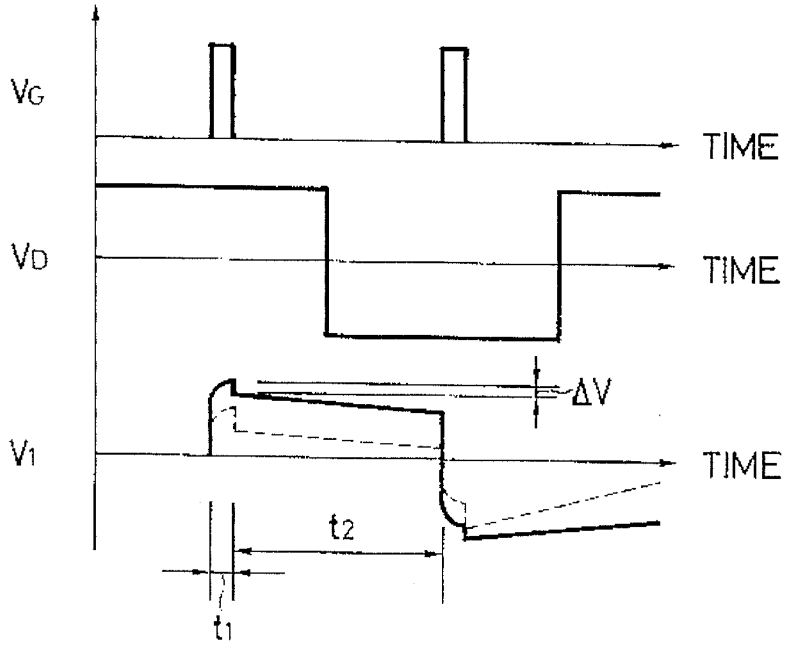
FIG. 13(B) PRIOR ART
FIG. 13(B) is a waveform diagram illustrating the waveforms of signals for driving the active-matrix circuit shown in FIG. 13(A)

To simplify the illustration, it is assumed that the counter electrode is at 0 potential. When potential $V_G$ is applied at first, potential $V_D$ is positive and so the pixel electrode VLC becomes positive. At this time, as already described in connection with FIG. 13, the potential drops by $\Delta V$. Then, the pixel potential $V_{LC}$ gradually approaches zero by spontaneous discharge. However, where the transmittance $T_{LC}$ of the pixel is noticed, this transmittance is kept constant although the pixel potential $V_{LC}$ drops. If the liquid crystal can retain electric charge well, the drop of the pixel potential $V_{LC}$ does not present serious problems. However, if a liquid crystal material incapable of retaining electric charge well is used, the other parameters $V_G$ and $V_D$ must be so set that the pixel potential $V_{LC}$ is permitted to drop.

In designing the device, the parameters $V_G$ and $V_D$ are set, based on the TFT having the worst characteristics. For example, in a pixel capable of holding electric charge worst, the potential $V_D$ is so set that the potential $V_{LC}$ subsequent to the duration $\mathbf{16}T_0$ of the longest subframe in the case of FIG. 12 is in excess of +9 V, preferably more than +11 V. Then, such a potential $V_G$ which is adequate to drive the set potential $V_D$ is set.

In FIG. 12, the potential $V_{LC}$ is shown to drop similarly in every subframe. In practice, the potential drops at a higher rate with increasing the duration of the subframe.

A second pulse $V_G$ is applied when a time $T_O$ passes since the first pulse $V_G$ has been applied. The data signal $V_D$ is also positive. Therefore, the pixel potential $V_{LC}$ remains positive. However, additional electric charge is injected, so that the potential is again increased. The transmittance $T_{LC}$ of the pixel does not change.

A third pulse $V_G$ is applied after a time $\mathbf{16}T_0$. Since the data signal $V_D$ is negative, the pixel potential $V_{LC}$ is inverted and becomes negative. Also, the transmittance varies but at a comparatively low rate. If the applied voltage is less than 10 V, a time of about 50 μsec is required. On the other hand, the width of the pulse $V_G$ is less than 30 μsec, which constitutes no impediment since the optical response transition of this liquid crystal is induced not by the pulse $V_G$ but by the pixel potential $V_{LC}$.

A third pulse $V_G$ is applied after a time $2T_0$. At this time, the data signal $V_D$ is negative and so the state of the pixel does not change. A fourth pulse $V_G$ is applied after a time $8T_0$. At this time, the data signal $V_D$ is positive and thus the pixel potential $V_{LC}$ goes back to positive. Also, the transmittance $T_{LC}$ of the pixel varies. Finally, the first pulse $V_G$ of the next frame is applied after a time $4T_0$. Thus, one frame ends. Such five subframes are appropriately combined to obtain 32 gray levels. By the operation described thus far, 1+16+4=21th gray levels are derived.

In the operation described above, it is important to determine the optimum unit time $T_0$. As described already, the optical response time of a ferroelectric or antiferroelectric liquid crystal depends on the applied voltage. If the voltage is approximately 15 V as described above, the response time is 50 μsec. Generally, the optical response time is in inverse proportion to the applied voltage. In order to have good moving pictures displayed and to prevent flickering, the duration of one frame is required to be shorter than 100 μsec, preferably shorter than 30 msec. As an example, where the duration of one frame is 30 msec, the maximum number of gray levels is 30 msec divided by 50 μsec, i.e., 600. In practice, it is necessary that the optical response time be several times as long as the above-described value to permit complete optical response. Hence, the maximum number of gray levels is about 100. This restriction is modified by increasing the magnitude of the voltage applied to the liquid crystal or the strength of the electric field and shortening the optical response time. In this case, it is necessary that the breakdown voltages of the TFTs be improved accordingly.

In the novel structure, where a digital gray scale display is provided as described above, a uniform gray scale can be obtained even if the TFTs are somewhat different in characteristics. This is because the ferroelectric or antiferroelectric liquid crystal substantially responds not to the effective voltage value but to changes in the polarity of the electric field. In particular, when an ON voltage is kept applied to the ferroelectric or antiferroelectric liquid crystal for a time exceeding 1 msec, the liquid crystal shows the same transmittance, whether the voltage is 5 V or 5.1 V.

Figure 16:
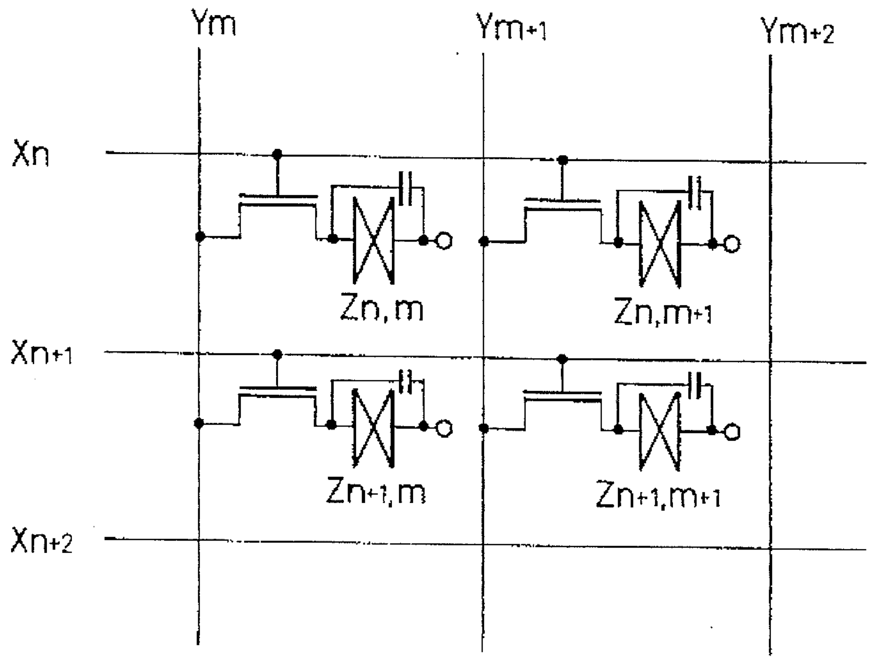
FIG. 16 is a circuit diagram of a part of a matrix structure according to Example 2 of the present invention.
Figure 17:
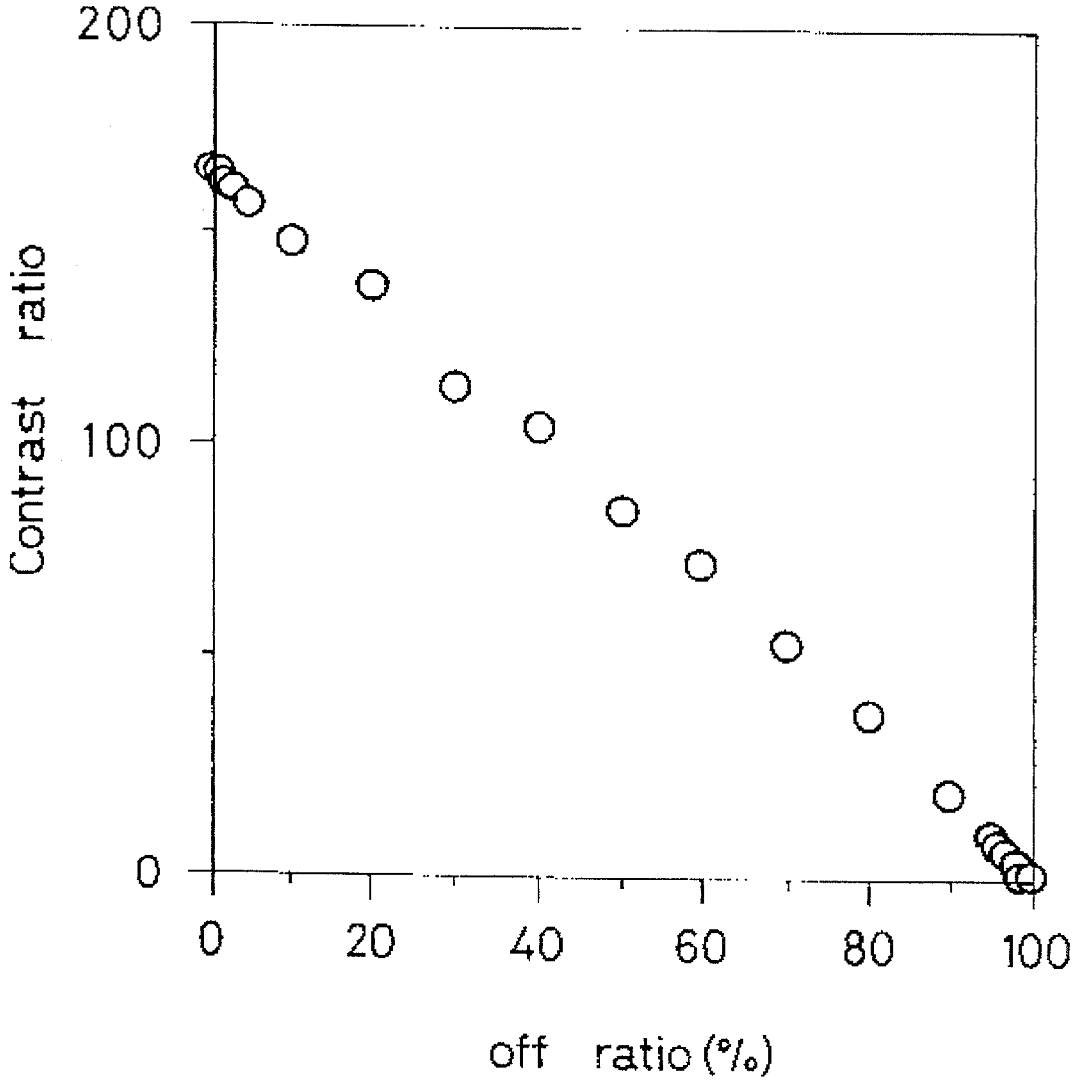
FIG. 17 is a graph in which the contrast ratio of a liquid crystal display according to the invention is plotted against the pulse duration time.

To demonstrate an example of the above-described advantage, a liquid crystal display was fabricated from a ferroelectric liquid crystal such as phenyl pyrimidine. The durations of applied pulses were changed to control the contrast, thus producing a gray scale as shown in FIG. 16. Similar effects were observed in materials comprising high polymers in which a ferroelectric or antiferroelectric liquid crystal was dispersed. However, where a TN liquid crystal is employed, even if the pulse widths were varied similarly to obtain a gray scale, such a linear gray scale could not be derived.

In a liquid crystal electro-optical device for producing a gray scale by controlling the time for which an electric field is applied to the liquid crystal according to the present invention, usable ferroelectric and antiferroelectric liquid crystals are limited, for the following reasons.

Interaction between the spontaneous polarization of the liquid crystal material of a ferroelectric liquid crystal and an external electric field produces a torque, which switches liquid crystal molecules between different states. Therefore, in order to activate the ferroelectric or antiferroelectric liquid crystal, the electric field for inverting the spontaneous polarization of the liquid crystal material is set up between electrodes. For this purpose, it is necessary that the gap between the electrodes be filled with a sufficient amount of electric charge. If a continuous electric field is applied to the liquid crystal material from the outside, electric charge is constantly supplied from the outside to the electrodes. Consequently, the liquid crystal molecules respond to the electric-field. When the spontaneous polarization is inverted, an electric current flows between the electrodes, thus consuming electric charge. In spite of this consumption, the voltage developed between the electrodes is maintained at the voltage of the external voltage source.

Where a liquid crystal is driven by TFTs as in the present invention, electric charge is supplied to the electrodes from the outside only while pulses are being applied to the gates of devices. Accordingly, after the TFTs have been turned off, the electrodes are opened. Thus, when the spontaneous polarization is inverted, electric power is consumed only between the electrodes.

Ferroelectric liquid crystals and antiferroelectric liquid crystals respond at speeds of several microseconds at best. To have a more accurate gray scale, the pulse width must be set to 1 μsec, for example. In this case, the liquid crystal molecules are inverted while the TFTs are OFF.

Accordingly, where the response time of the liquid crystal is longer than the pulse width, if most of the liquid crystal molecules are inverted during OFF state of TFTs, electric charge sufficient to invert the spontaneous polarization must be supplied to the gap between the electrodes while the TFTs are in ON state. In cases of ferroelectric and antiferroelectric liquid crystals having large spontaneous polarization, the amount of electric charge supplied to the gap between the electrodes is, of course, increased. When the pulse width is short and the amount of electric charge supplied to the gap between the electrodes is small, not all spontaneous polarization is inverted and so the optical response is insufficient.

When the electrodes are in an open state, if the voltage between the electrodes is not maintained above a given value until the next pulse is applied, then liquid crystal molecules once switched to other state are returned to their original state, thus deteriorating the optical characteristics.

In practice, where the novel image display is provided by a liquid crystal electro-optical device using a ferroelectric or antiferroelectric liquid crystal, its optical characteristics are affected greatly by the physical properties of the liquid crystal material. Therefore, the spontaneous polarization of the liquid crystal material and the capacitance of auxiliary capacitors are required to be so selected that they are appropriate for the present method.

Where the novel liquid crystal electro-optical device produces a digital gray scale, the liquid crystal material must have certain magnitude of spontaneous polarization. Also, auxiliary capacitors might be needed. The magnitude of the spontaneous polarization and the auxiliary capacitance are found in the manner described below.

We now discuss a ferroelectric or antiferroelectric liquid crystal display showing optical response. We consider that the relation given by Eq. (1) must hold among the applied voltage, the pixel capacitance, the spontaneous polarization of the liquid crystal material, and the voltage at which a transition is made from one subframe to the next subframe.

$$C_{LC}(V-V_{rem}) \geqq 2 \cdot Ps \cdot S \quad (1)$$

where $C_{LC}$ is the capacitance between the pixel electrodes, V is the voltage of a signal applied to the pixel, Ps is the spontaneous polarization of the ferroelectric or antiferroelectric liquid crystal material, S is the area of the pixel electrode, and $V_{rem}$ is the voltage developed between the electrodes immediately before the next pulse is applied. Eq. (1) indicates inflow and outflow of electric charge when the liquid crystal material is inverted. The capacitance $C_{LC}$ contained in Eq. (1) can be given by $$C_{LC} = \epsilon \cdot S/d \quad (2)$$

where $\epsilon$ is the dielectric constant of a ferroelectric or antiferroelectric liquid crystal material, S is the area of the pixel electrode, and d is the distance between the pixel electrodes on two opposite substrates.

Especially, in cases of ferroelectric and antiferroelectric liquid crystals, the contribution of the spontaneous polarization to the dielectric constant $\epsilon$ included in Eq. (2) must be considered. The dielectric constant of the ferroelectric or antiferroelectric liquid crystal material is divided into a component regarding the spontaneous polarization and the other component. Thus, the dielectric constant can be given by $$\epsilon=\epsilon_O\,(a\cdot P+\epsilon_r) \tag{3}$$

where $\epsilon_O$ is the dielectric constant of vacuum ($8.854\times10^{-12}$[F/m]), a is a constant, P is a value regarding the spontaneous polarization, and $\epsilon_r$ is a value indicating the portion not associated with the spontaneous polarization.

Generally, in a ferroelectric or antiferroelectric liquid crystal, if complete optical response is produced, the value in the parentheses of Eq. (3) assumes a value of 10 to 15 by the effect of the spontaneous polarization. Therefore, assuming that this value is 12, the dielectric constant of the liquid crystal material is 106 pF/m.

Where the area of the pixel electrode is $2.5\times10^{-5}$ $m^2$ and the distance between the pixel electrodes on two opposite substrates is $2.5\times10^{-6}$ m, the capacitance of each pixel is 1.06 nF.

We have examined the optical characteristics of liquid crystal devices respectively made of various ferroelectric liquid crystals and various antiferroelectric liquid crystals, the devices being driven by a method according to the present invention. We have confirmed that the voltage between the electrodes when full optical characteristics are produced is 9 to 10 V. Assuming that the voltage $V_{rem}$ is 9 V, it can be seen from Eq. (1) that the spontaneous polarization of the liquid crystal material is 10.6 nC/$cm^2$.

Where a large amount of electric discharge is produced from the pixel electrodes and auxiliary capacitors are needed, the required magnitude of the spontaneous polarization and the magnitude of the auxiliary capacitance can be found by replacing $C_{LC}$ of Eq. (1) with $C_{LC}+C_{AD}$. That is, Eq. (1) can be changed into the form $$(C_{LC}+C_{AD})\,(V-V_{rem})\geqq 2\cdot Ps\cdot s \tag{4}$$

If the pulse width is so short that the liquid crystal cannot fully respond, and if almost no fluctuations take place in the liquid crystal, then the value in the parentheses in Eq. (3) is little affected by the spontaneous polarization and takes a value of 2 to 3. Therefore, if the value in the parentheses in Eq. (3) is equal to 2.5, the dielectric constant of the liquid crystal is 0.0221 pF/m. In consequence, the pixel electrode is 0.221 pF. Where full optical characteristics are obtained as described above, if the voltage $V_{rem}$ is 9 V and the spontaneous polarization is 20 nC/$cm^2$, then it can be seen from Eq. (4) that the auxiliary capacitance added to the pixel is 2000 pF. In this way, the value of the spontaneous polarization of the liquid crystal material and the value of the auxiliary capacitance required to carry out the present invention can be found.

EXAMPLE 1

N-channel polysilicon TFTs were fabricated on a Corning 7059 substrate by an ordinary low-temperature process. Pixel electrodes were disposed on the sides of the drains. Polyimide was applied to the surface of the substrate by spin coating and baked at 200° C. The thickness was 100 to 300 Å. Another substrate which was not divided into pixels was used as a counter electrode. Polyimide was directly applied to the counter electrode by spin coating. Both substrates were subjected to a rubbing process to orient the molecules along one axis. The rubbing directions were so set that they were perpendicular to each other when a cell was formed.

When the substrate having the TFTs was rubbed, sufficient care was taken, that is, the lead electrodes were connected with ground to prevent the devices from being destroyed by static electricity. Then, a spacer was applied to the substrate having the TFTs. A sealing agent was applied to the counter electrode. In this case, epoxy resin was applied as a sealing agent to the counter electrode by screen printing. Both substrates were bonded together with a gap of 1.5 μm in conformity with the diameter of the spacer. Ferroelectric liquid crystal ZLI3654 prepared by Merck Co. was injected into the cell. The liquid crystal material was heated up to 100° C. and injected into the cell in a vacuum when the liquid crystal had an anisotropic state. The device was sealed and then a driver circuit was connected. Thereafter, the device was tested.

A voltage of 15 V was applied to the gate to keep it on for 50 μsec. The optical response, or ON and OFF, when the source voltage was varied is shown in FIG. 6. Where the source voltage was positive, the transmissive state of the brighter side becomes clearer as the applied voltage is increased. On the other hand, the dark state becomes darker with increasing the applied voltage. In this way, a sharp gray scale was obtained.

In order to produce a clear ON state with a positive voltage, it is necessary to apply a negative voltage before the application of the positive voltage. A clear gray scale was derived at all times by previously applying a negative voltage of 8 V.

EXAMPLE 2

A display using an organic ferroelectric thin film as a charge supply means is now described by referring to FIG. 8. ITO was sputtered as a 1000 Å-thick-film on a glass substrate 160 by DC sputtering. The ITO film was etched into a given pixel pattern 161 by an ordinary photolithography process to form pixel electrodes.

Copolymer of trifluoroethylene and vinylidene fluoride was dissolved in dimethyl formamide to create 1–5% solution. This was applied to the substrate by spin coating. The laminate was heated at 170° C. for 2 hours. Then, it was gradually cooled down to room temperature to improve the crystallinity of the ferroelectric thin film 162.

Then, chromium was sputtered up to a thickness of 1500 Å. This chromium film was patterned to form lead electrodes 163. In FIG. 8, the ferroelectric thin film is shown to have the same size as a chromium electrode. After the chromium film was patterned, the resist was ashed. At this time, the whole ferroelectric thin film was etched to form the device shown in FIG. 8. If the process is interrupted, the ferroelectric thin film will be left over the whole surface. Experiment has shown that either method can be adopted. A desired electrode pattern 164 was formed on a counter glass substrate 168. Polyimide 165 was applied to the pattern 164 by spin coating and heated to complete a film. The film was rubbed and then the substrate 160 having the ferroelectric thin film was bonded to the counter electrode with a gap of 2 μm therebetween. They were fixed with a sealing agent 167. A phenyl pyrimidine ferroelectric liquid crystal having a phase sequence of isotropic-smectic A phase-smectic C* phase was heated and injected into the cell. A circuit was connected and then the device was inspected.

Figure 9:
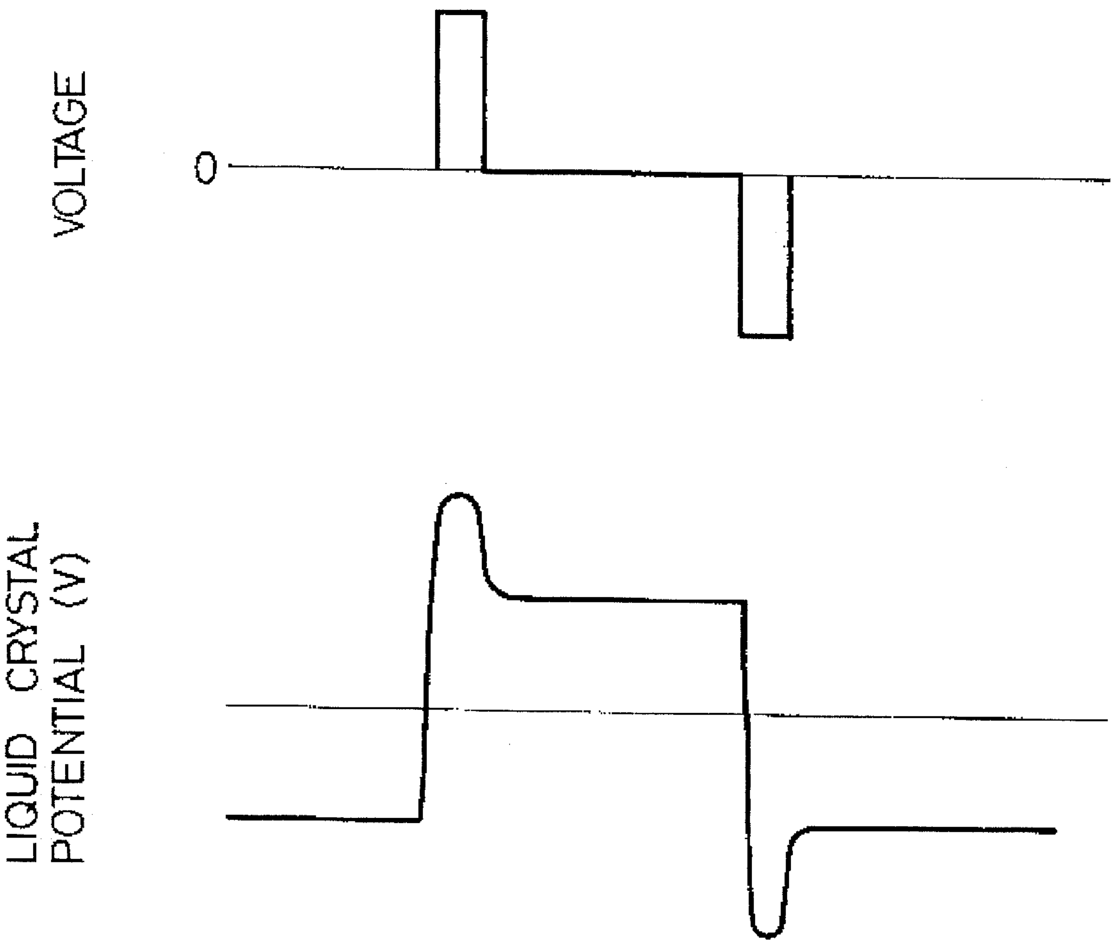
FIG. 9 is a diagram illustrating the operation of the liquid crystal electro-optical device shown in FIG. 7.

The potential developed between the ferroelectric thin film and the liquid crystal when a pulse was applied to the liquid crystal cell having the ferroelectric thin film was measured as a liquid crystal potential. The results are shown in FIG. 9. The liquid crystal potential increases while the pulse is being applied. After cease of the pulse, a given potential remains. That is, a given amount of spontaneous polarization generated when the pulse was applied is partially supplied to the pixel electrode after the pulse ceases. As a result, the liquid crystal potential is produced.

Figure 10:
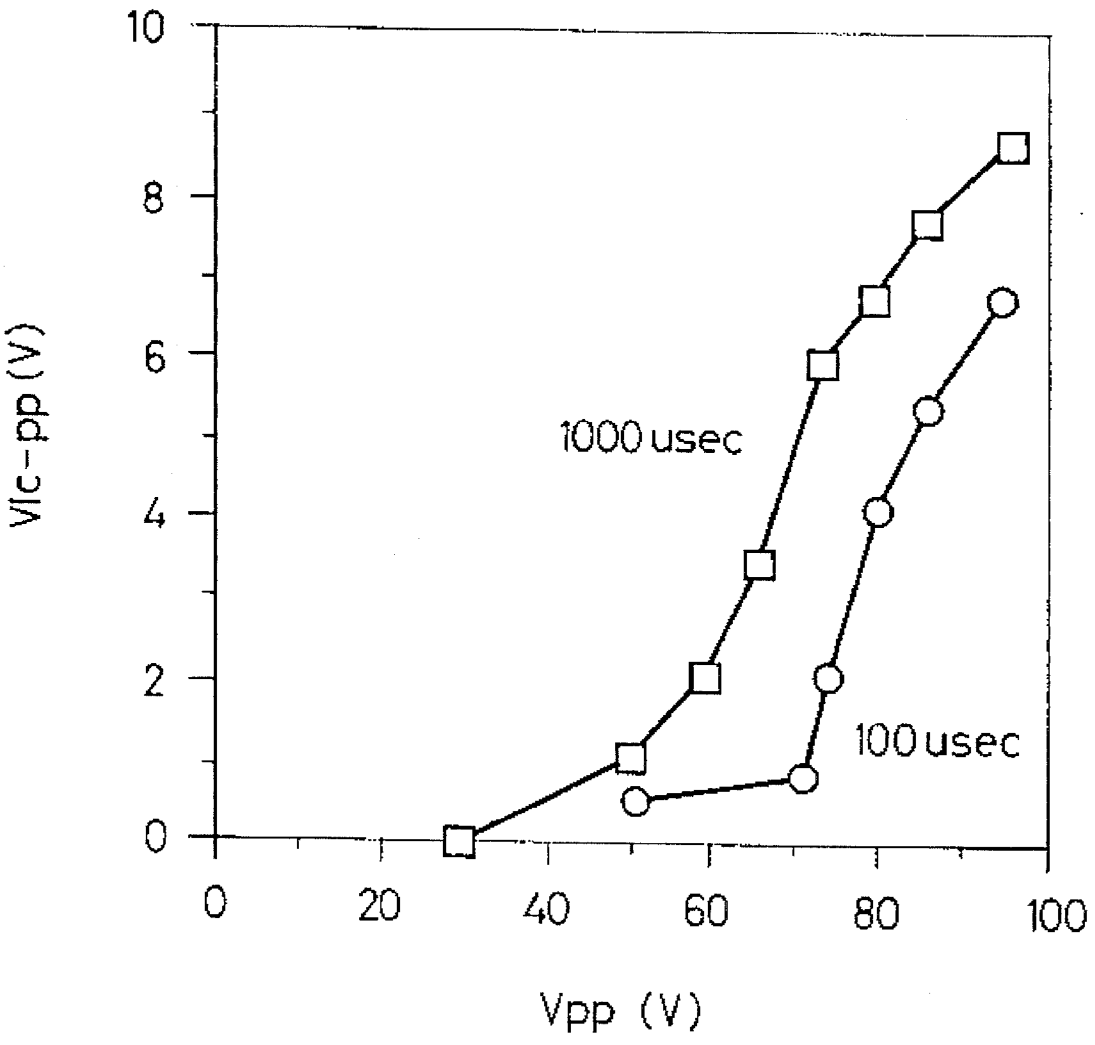
FIG. 10 is a graph illustrating the operation of the liquid crystal electro-optical device shown in FIG. 7.
Figure 11A:
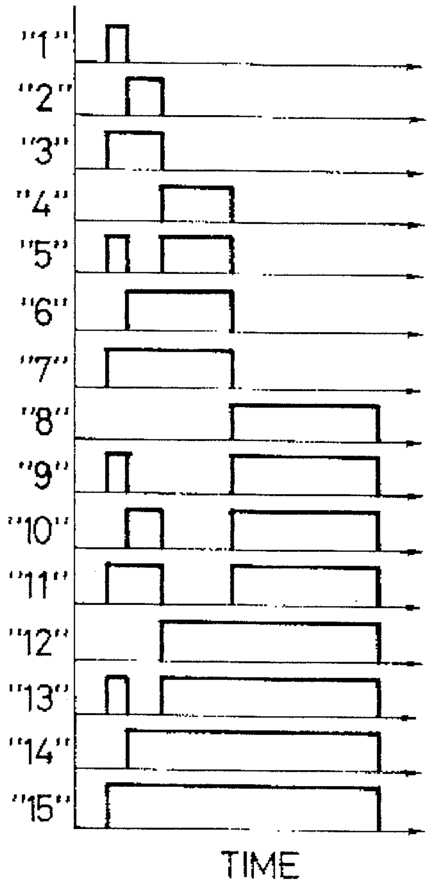
FIG. 11, (A) and 11 (B), are waveform diagrams illustrating driving signals used in a liquid crystal electro-optical device according to the invention.
Figure 11B:
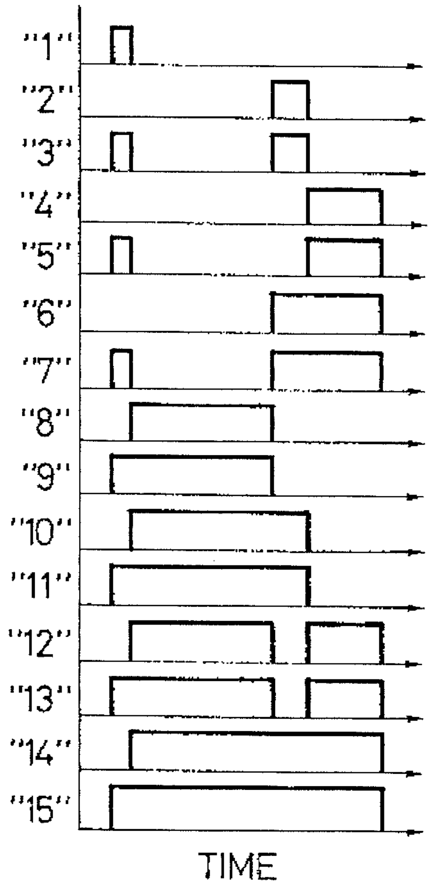

This liquid crystal potential is actually applied to the liquid crystal, which in turn responds to the potential. Variations in the liquid crystal potential produced when the applied voltage and the pulse width are changed are shown in FIG. 10. When the pulse width is set to 1000 μsec, the liquid crystal potential is produced at 40 Vpp. When the applied voltage is 100 Vpp (V), the liquid crystal potential $V_{LC}$pp (V) is 10 Vpp. A sharp threshold value appears here. Even where the applied voltage is changed only with the ferroelectric thin film and the resulting spontaneous polarization value is measured, the spontaneous value decreases with reducing the applied voltage. A similar tendency was confirmed where the liquid crystal was connected in series.

When the pulse width is further changed to 100 μsec, a higher voltage is needed to obtain the same liquid crystal potential. This liquid crystal potential has the same meaning as the voltage plotted on the horizontal axis of FIG. 6 showing the response of the liquid crystal when TFTs are used. Therefore, when the ferroelectric thin film is used, if such liquid crystal potential is measured, then it is certain that the optical response of the liquid crystal gives rise to a sufficiently wide gray scale. A display device using a ferroelectric thin film was fabricated in the same way as in the case using TFTs. A sufficient gray scale could be obtained from this device by changing the voltage between 20 and 40 V.

EXAMPLE 3

A liquid crystal display fabricated according to the present example is shown in FIG. 16. One substrate 11 is located on one side of a liquid crystal cell and made of non-alkali glass. An active matrix 15 using crystalline silicon TFTs was formed on the substrate 11. The circuit configuration of the active-matrix substrate is shown in FIG. 14. This circuit has no auxiliary capacitors. Each TFT consists of a single-gate PMOS, which has small leakage current and large ON/OFF current ratio. Typically, the leakage current was less than 1 pA when the gate voltage was +15 V and the drain voltage was −10 V. The ON/OFF current ratio was more than 7.5 orders of magnitude when the gate voltage was −15 V/+15 V, and the drain voltage was −10 V.

An ITO film 14 was formed over the whole surface of the other substrate 12. A silicon oxide film 21 for preventing short circuit was formed on the ITO film 14. This substrate 12 was used.

Each pixel 13 measured 20 μm×60 μm. The matrix was composed of 1920×480 dots. The charge-retaining characteristics of each pixel were examined. As a data signal, −10 V was applied. The worst voltage characteristic was about −9 V after about 3 msec.

Therefore, in the present example, the width of the scanning signal pulses applied to the matrix was set to 1 μsec. The height of the pulses was −15 V. The data signal was +15 V.

Then, a high polymer 16 dissolved in a solvent was applied to the substrate by spin coating. The used high polymer was polyimide resin manufactured by Toray Industries, Japan. As the solvent, n-methyl-2-pyrolidone was used. The dilution factor of the high polymer was 8. The substrate to which the high polymer was applied was heated at 280° C. for 2.5 hours to dry the solvent. The resin became an imide. The resin on this substrate was rubbed in one direction at a rotational frequency of 1000 rpm with a roller on which cloth such as velvet was wound. Subsequently, the two substrates were held together under a pressure with an inorganic spacer of 1 to 7 μm therebetween. A liquid crystal material 17 was injected between these two substrates.

Liquid crystal materials are next described. A liquid crystal material used in the present example was ferroelectric liquid crystal CS-1014 manufactured by Chisso Corporation, Japan. This liquid crystal has a phase sequence given by Iso-N* -SmA-SmC* -Cry. The transition temperature of Iso-N* is 81° C. The transition temperature of N*-SmA is 69° C. The transition temperature of SmA-SmC* is 54° C. The transition temperature of SmC* -Cry is −21° C. The thickness of the liquid crystal cell was 1.6 μm. The spontaneous polarization of the liquid crystal was 5 nC/cm$^2$.

When the voltage applied to the liquid crystal was below 5 V, we observed that domains were created in the liquid crystal. These domains deteriorate the characteristics when a digital gray scale is produced. Therefore, the applied voltage is preferably set to a higher voltage to prevent such domains.

Figure 19:
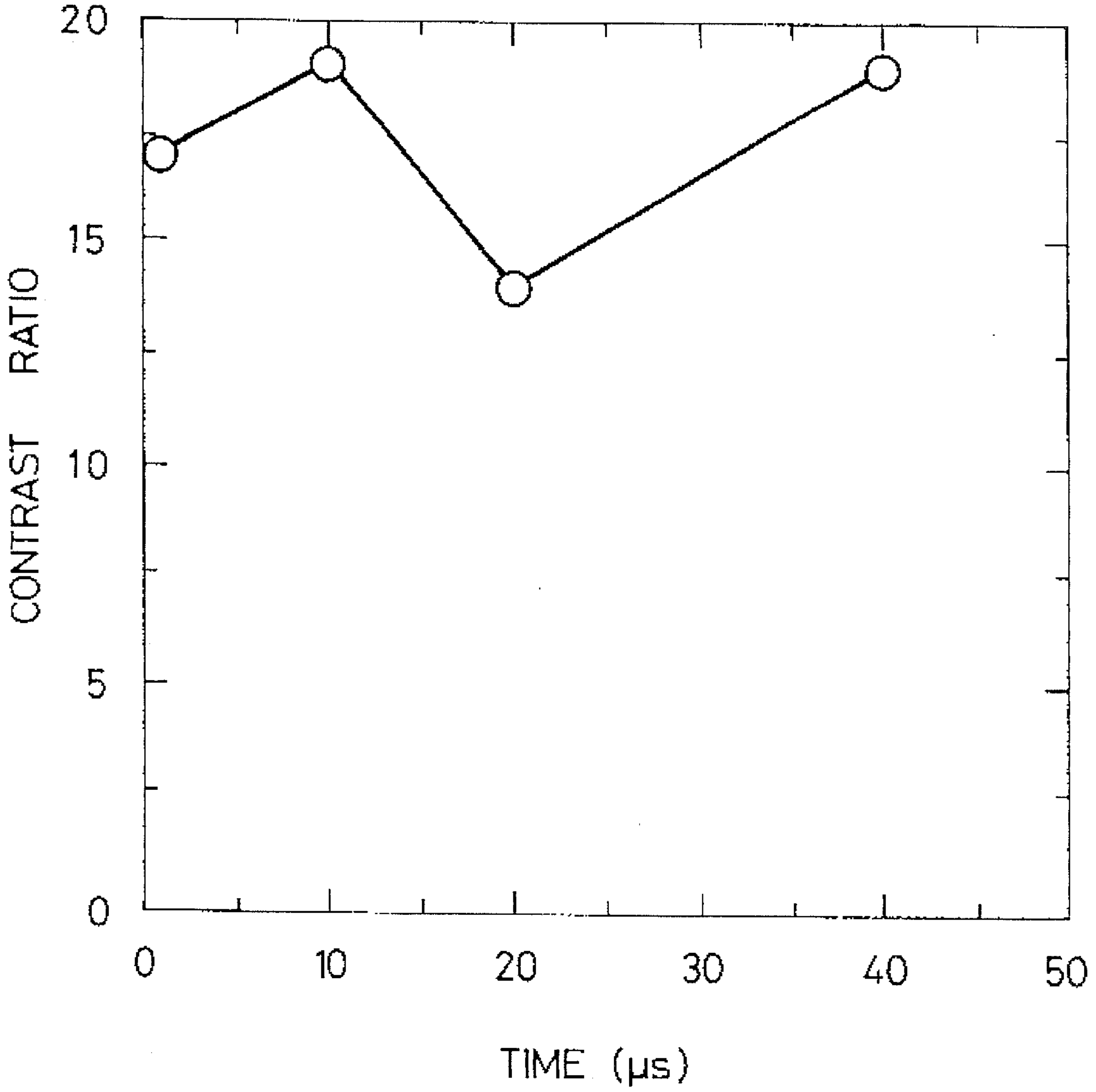
FIG. 19 is a graph illustrating the dependence of the contrast ratio of the liquid crystal electro-optical device shown in FIG. 18 on the data signal application time.

The dependence of the contrast ratio of the liquid crystal electro-optical device in the present example on the time for which a data signal is applied is shown in FIG. 19. As can be seen from the graph of FIG. 19, the liquid crystal completely responds even if the pulse width is 1 μsec.

A digital gray scale was produced by this liquid crystal electro-optical device. In particular, as shown in FIG. 12, one frame was divided into 5 subframes, and 32 digital gray levels were produced. The durations of the first, second, third, fourth, and fifth subframes were 179 μsec, 2.87 msec, 358 μsec, 1.43 msec, and 717 μsec, respectively. The duration of one frame was 5.5 msec, i.e., 180 Hz. A maximum contrast ratio of 180 and 32 gray levels could be obtained from this liquid crystal electro-optical display.

COMPARATIVE EXAMPLE

Figure 20:
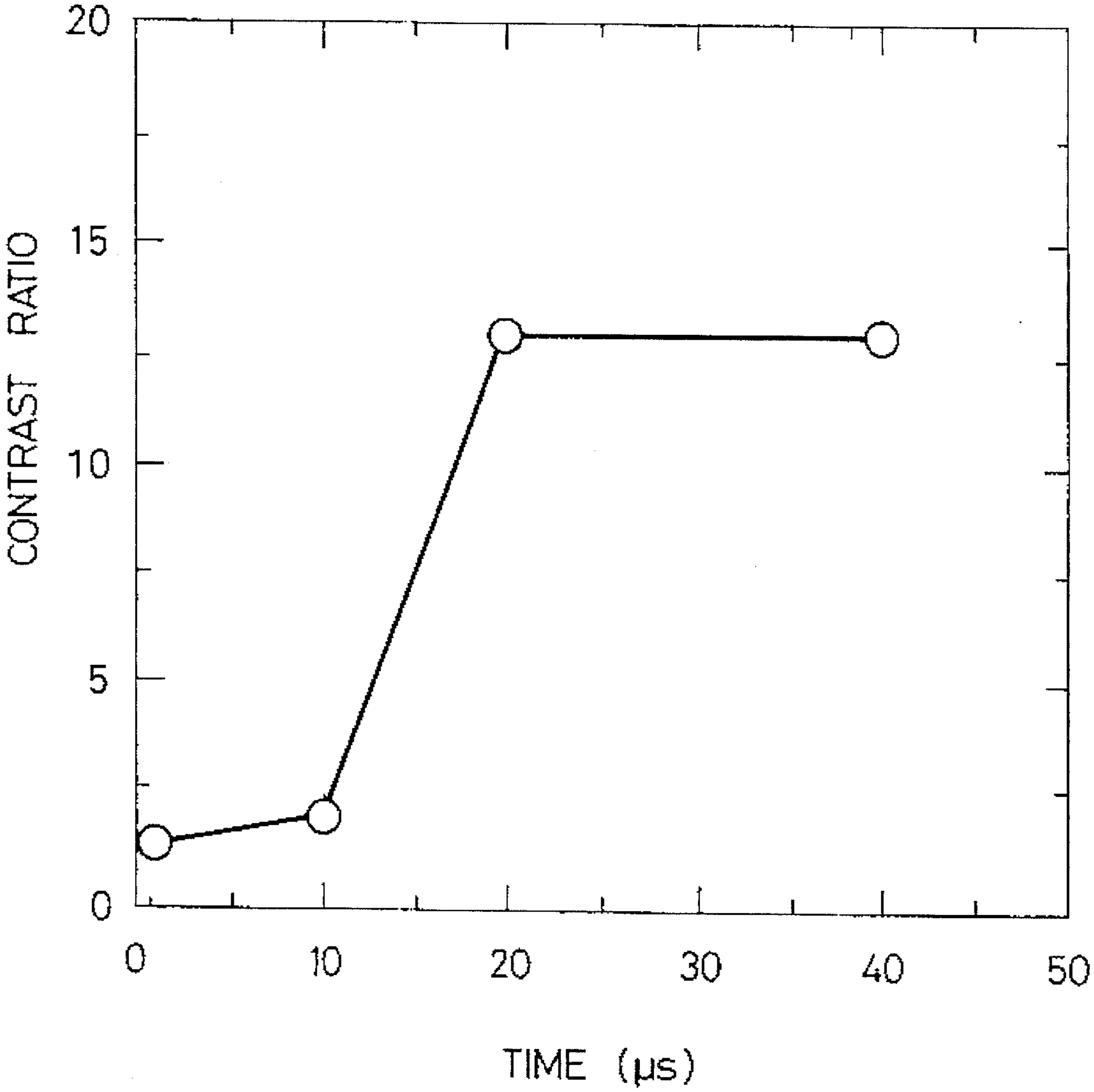
FIG. 20 is a graph illustrating the dependence of the contrast ratio of a liquid crystal electro-optical device of Comparative Example on the data signal application time.

A liquid crystal electro-optical device which was similar in structure to Example 3 except that a ferroelectric liquid crystal having a spontaneous polarization of 17 nC/cm$^2$ was used. The time for which the scanning signal pulse was applied to the matrix was changed, and the intensity of light transmitted through the device was measured. The results are shown in FIG. 20. As can be seen from the graph of FIG. 20, where the pulse width is shorter than 40 μsec, the response is incomplete. This demonstrates that selection of a liquid crystal material whose spontaneous polarization satisfies Eq. (1) is effective in making full use of the characteristics of the device.

EXAMPLE 4

Figure 21:
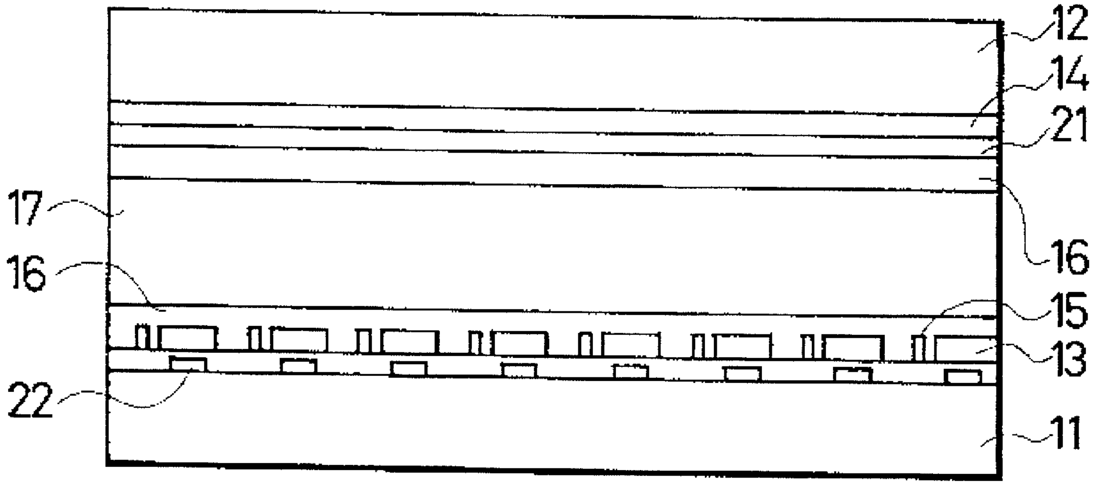
FIG. 21 is a schematic cross section of a liquid crystal electro-optical device according to Example 2 of the present invention.

The structure of a liquid crystal electro-optical device fabricated according to the present example is shown in FIG. 21. One substrate 11 is located on one side of a liquid crystal cell and made of non-alkali glass. An active matrix 15 using crystalline silicon TFTs was formed on the substrate 11. A liquid crystal material having a large spontaneous polarization as given below was used in the present example and so auxiliary capacitors 22 were incorporated in the active matrix circuit configuration as shown in FIG. 14. The auxiliary capacitors were formed on the substrate 11 as shown in FIG. 21. Each auxiliary capacitor 22 has a capacitance of 0.05 pF. Each TFT consists of a single-gate PMOS, which has small leakage current and large ON/OFF current ratio. Typically, the leakage current was less than 1 pA when the gate voltage was +15 V and the drain voltage was −10 V. The ON/OFF current ratio was more than 7.5 orders magnitude when the gate voltage was −15 V/+15 V and the drain voltage was −10 V.

An ITO film 14 was formed over the whole surface of the other substrate 12. A silicon oxide film 21 for preventing short circuit was formed on the ITO film 14. This substrate 12 was used.

Each pixel 13 measured 20 μm×60 μm. The matrix consisted of 1920×480 dots. The charge-retaining characteristics of each pixel were examined. As a data signal, −10 V was applied. The worst voltage characteristic was about −9 V after 3 msec. The scanning signal pulses applied to the matrix was set to 1 μsec. The height of the pulses was −15 V. The data signal was ±15 V.

Then, a high polymer 16 dissolved in a solvent was applied to the substrate by spin coating. The used high polymer was polyimide resin manufactured by Toray Industries, Japan. As the solvent, n-methyl-2-pyrolidone was used. The dilution factor of the high polymer was 8. The substrate to which the high polymer was applied was heated at 280° C. for 2.5 hours to dry the solvent. The resin became an imide. The resin on this substrate was rubbed in one direction at a rotational frequency of 1000 rpm with a roller on which cloth such as velvet was wound. Subsequently, the two substrates were held together under a pressure with an inorganic spacer of 1 to 7 μm therebetween. A liquid crystal material 17 was injected between these two substrates.

Liquid crystal materials are next described. A liquid crystal material used in the present example was a ferroelectric liquid crystal consisting of a phenyl pyrimidine. This liquid crystal has a phase sequence given by Iso-SmA-SmC*-Cry. The transition temperature of Iso-SmA is 71.7° C. The transition temperature of SmA-SmC* is 46.3° C. The transition temperature of SmC*-Cry is −9.7° C. The spontaneous polarization of the liquid crystal was 18 nC/cm$^2$. The thickness of the liquid crystal cell was 2.5 μm.

When the voltage applied to the liquid crystal was below 5 V, we observed that domains were created in the liquid crystal. These domains deteriorate the characteristics when a digital gray scale is produced. Therefore, the applied voltage is preferably set to a higher voltage to prevent such domains.

Figure 22:
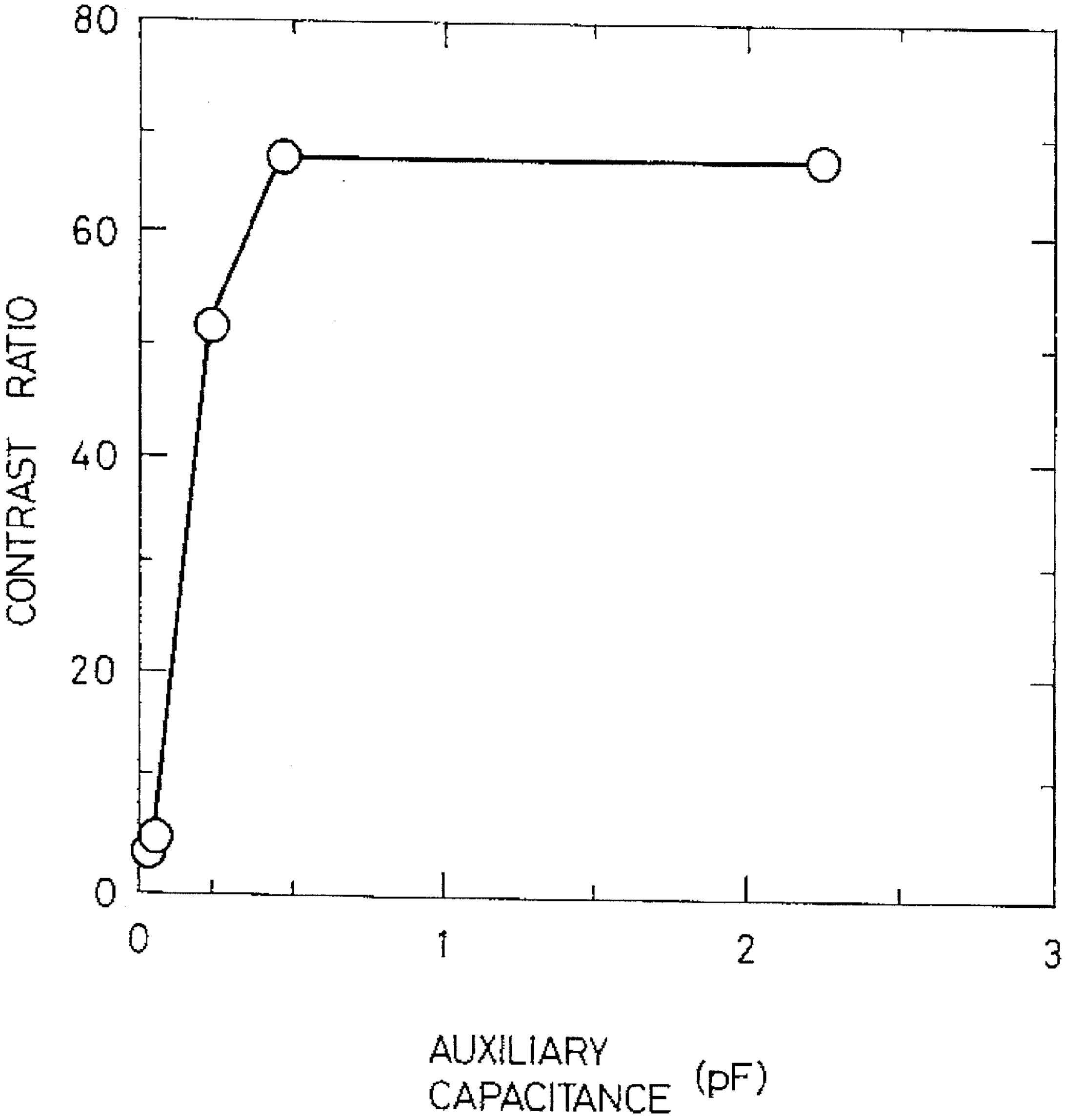
FIG. 22 is a graph illustrating the dependence of the contrast ratio of the liquid crystal electro-optical device shown in FIG. 18 on the auxiliary capacitance.

The dependence of the contrast ratio of the liquid crystal electro-optical device of the present example on the auxiliary capacitance when the time for which a data signal is applied is kept at 1 μsec is shown in FIG. 22. As can be seen from the graph of FIG. 22, the provision of the auxiliary capacitors of 0.5 pF permits the liquid crystal material having large spontaneous polarization to respond completely.

A digital gray scale was produced by this liquid crystal electro-optical device. In particular, as shown in FIG. 12, one frame was divided into 5 subframes, and 32 digital gray levels were produced. The durations of the first, second, third, fourth, and fifth subframes were 179 μsec, 2.87 msec, 358 μsec, 1.43 msec, and 717 μsec, respectively. The duration of one frame was 5.5 msec, i.e., 180 Hz. A maximum contrast ratio of 180 and 32 gray levels could be obtained from this liquid crystal electro-optical display.

EXAMPLE 5

Figure 18:
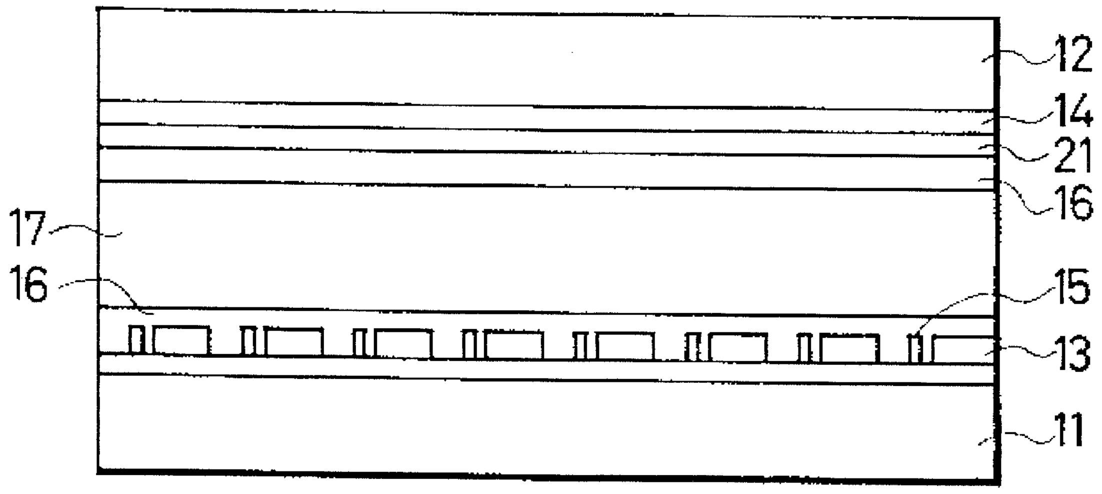
FIG. 18 is a schematic cross section of a liquid crystal electro-optical device according to Example I of the present invention.

A liquid crystal electro-optical device fabricated in the present example was similar in structure to Example 1 shown in FIG. 18. One substrate 11 is located on one side of a liquid crystal cell and made of non-alkali glass. An active matrix 15 using crystalline silicon TFTs was formed on the substrate 11. The circuit configuration of the active matrix substrate is shown in FIG. 14 and has no auxiliary capacitors.

Each TFT consists of a single-gate PMOS, which has small leakage current and large ON/OFF current ratio. Typically, the leakage current was less than 1 pA when the gate voltage was +15 V and the drain voltage was −10 V. The ON/OFF current ratio was more than 7.5 orders of magnitude when the gate voltage was −15 V/+15 V, and the drain voltage was −10 V.

An ITO film 14 was formed over the whole surface of the other substrate 12. A silicon oxide film 21 for preventing short circuit was formed on the ITO film 14. This substrate 12 was used.

Each pixel 13 measured 20 μm×60 μm. The matrix consisted of 1920×480 dots. The charge-retaining characteristics of each pixel were examined. As a data signal, −10 V was applied. The worst voltage characteristic was about −9 V after 3 msec.

Accordingly, in the present example, the scanning signal pulses applied to the matrix was set to 1 μsec. The height of the pulses was −15 V. The data signal was ±15 V.

Then, a high polymer 16 dissolved in a solvent was applied to the substrate by spin coating. The used high polymer was polyimide resin manufactured by Toray Industries, Japan. As the solvent, n-methyl-2-pyrolidone was used. The dilution factor of the high polymer was 8. The substrate to which the high polymer was applied was heated at 280° C. for 2.5 hours to dry the solvent. The resin became an imide. The resin on this substrate was rubbed in one direction at a rotational frequency of 1000 rpm with a roller on which cloth such as velvet was wound. Subsequently, the two substrates were held together under a pressure with an inorganic spacer of 1 to 7 μm therebetween. A liquid crystal material 17 was injected between these two substrates.

Liquid crystal materials are next described. A liquid crystal material used in the present example was a ferroelectric liquid crystal consisting of a phenyl pyrimidine. This liquid crystal has a phase sequence given by Iso-SmA-SmC*-Cry. The transition temperature of Iso-SmA is 71.7° C. The transition temperature of SmA-SmC* is 46.3° C. The transition temperature of SmC*-Cry is −9.7° C. The spontaneous polarization of the liquid crystal was 18 nC/cm$^2$. The thickness of the liquid crystal cell was 2.5 μm.

When the voltage applied to the liquid crystal was below 5 V, we observed that domains were created in the liquid crystal. These domains deteriorate the characteristics when a digital gray scale is produced. Therefore, the applied voltage is preferably set to a higher voltage to prevent such domains.

Figure 23:
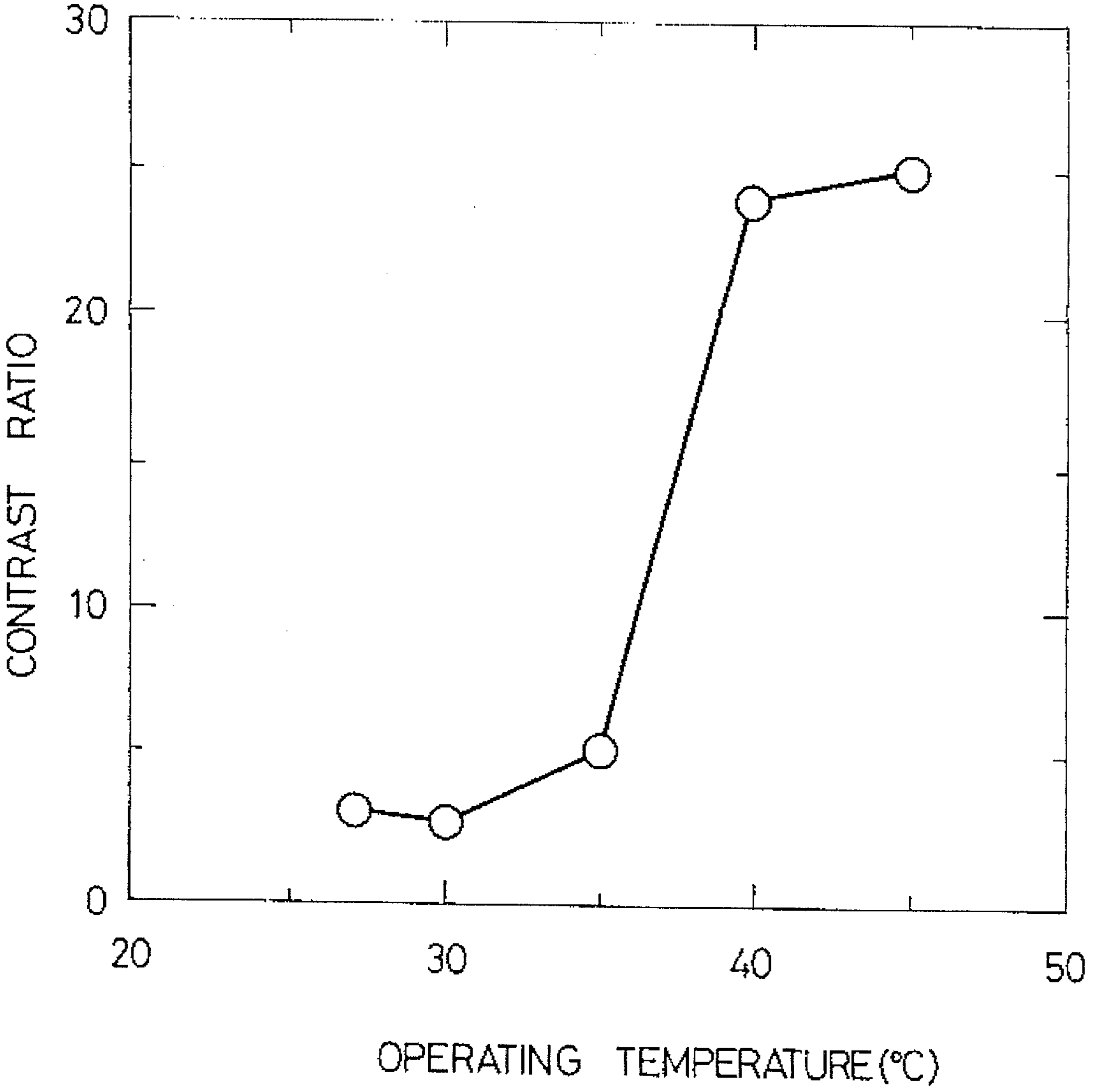
FIG. 23 is a graph illustrating the dependence of a contrast ratio of a liquid crystal electro-optical device according to Example 3 of the present invention on the operating temperature.
Figure 24:
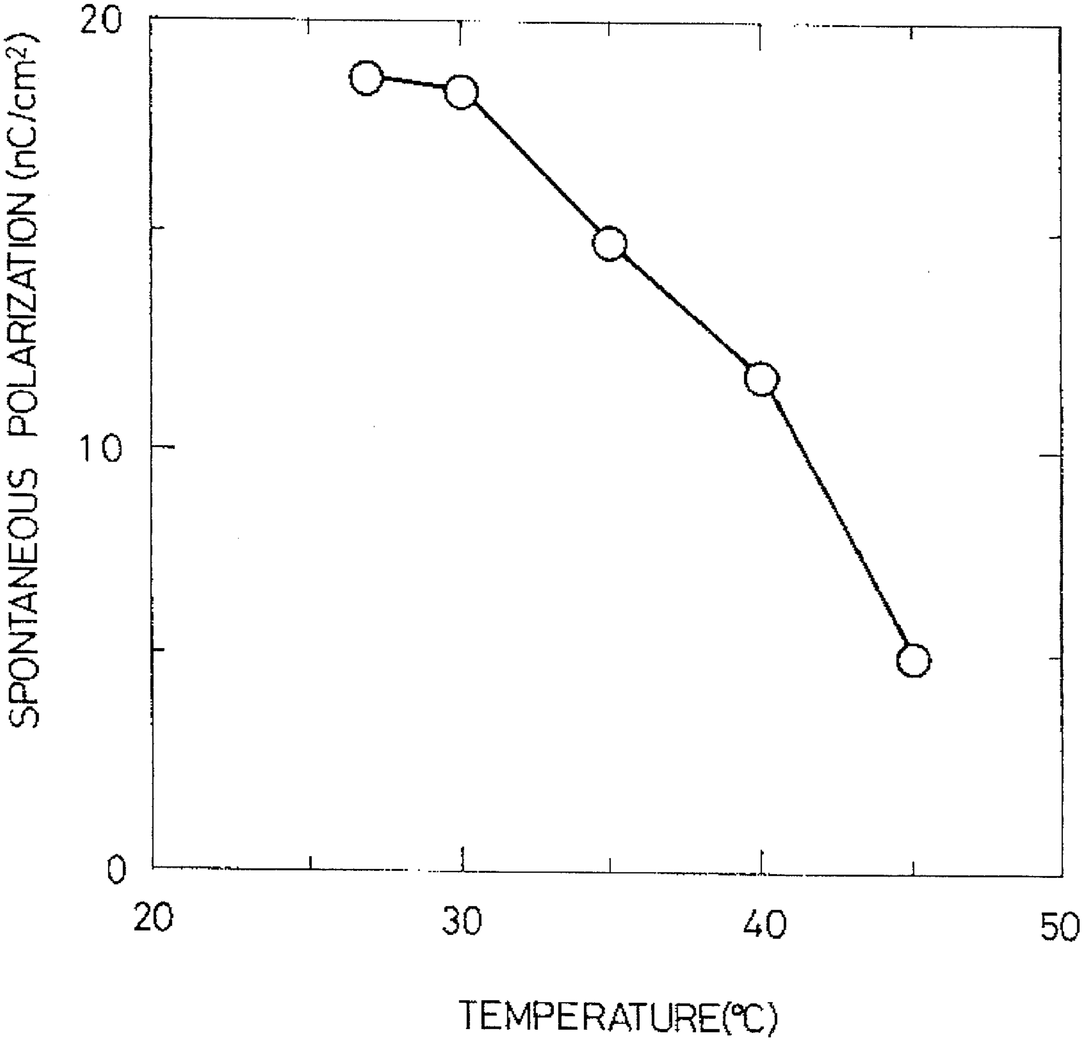
FIG. 24 is a graph illustrating the dependence of the spontaneous polarization of a liquid crystal material on temperature, the liquid crystal material being used in a liquid crystal electro-optical device according to Example 3 of the present invention.

The dependence of the contrast ratio of the liquid crystal electro-optical device of the present example on the operating temperature is shown in FIG. 23, and in which the time for which a data signal is applied is kept at 1 μsec. The dependence of the spontaneous polarization of the liquid crystal material used in the present example on temperature is shown in FIG. 24. As shown in FIG. 23, the liquid crystal electro-optical device of the present example shows a low contrast ratio and poor optical characteristics at room temperature. We consider that this is because the spontaneous polarization has a large value and thus liquid crystal molecules do not completely respond in the driving method of the present example. However, it can be seen that elevating the temperature of the liquid crystal electro-optical device increases the contrast ratio and that the liquid crystal material completely responds when the operating temperature is 40° C. We consider that the temperature of the liquid crystal material is elevated, as shown in FIG. 24, so that the spontaneous polarization becomes small enough to implement the driving method of the present invention. Consequently, in the present example, when the liquid crystal electro-optical device is activated, temperature is maintained above 40° C. Various characteristics of the present invention when the device was driven were measured in a location where the temperature could be maintained constant as in a thermostatic chamber.

A digital gray scale was produced by this liquid crystal electro-optical device. In particular, as shown in FIG. 12, one frame was divided into 5 subframes, and 32 digital gray levels were produced. The durations of the first, second, third, fourth, and fifth subframes were 179 μsec, 2.87 msec, 358 μsec, 1.43 msec, and 717 μsec, respectively. The duration of one frame was 5.5 msec, i.e., 180 Hz. A maximum contrast ratio of 180 and 32 gray levels could be obtained from this liquid crystal electro-optical display.

Furthermore, a gray scale may be created by combining control of the transmittance utilizing different voltage values as illustrated in FIG. 5 with the gray scale making use of the subframes having different durations as illustrated in FIG. 12. In this way, a wider gray scale can be derived.

A liquid crystal material having spontaneous polarization is driven by a cell having TFTs or a ferroelectric thin film. A given amount of electric charge is applied to the liquid crystal material. In the next state, the resistivity of the liquid crystal is made high and the amount of electric charge can be maintained. In this structure, the ratio of the area of portions of the liquid crystal assuming a first state to the area of portions assuming a second state can be varied by controlling the amount of electric charge supplied. In this way, a high-performance liquid crystal display can be accomplished, by making use of the high speed and the wide viewing angle, along with the wide gray scale of the present invention. This is effective in fabricating a liquid crystal TV which can display images in response to video signals.

A liquid crystal electro-optical device using a ferroelectric liquid crystal material, an antiferroelectric liquid crystal, or a polymer dispersed liquid crystal (PDLC) comprising a high polymer in which a ferroelectric or antiferroelectric liquid crystal is dispersed is characterized in that the liquid crystal has such a spontaneous polarization which permits a digital gray scale. Auxiliary capacitors are formed on one substrate to permit the use of a liquid crystal material having large spontaneous polarization. As a result, a digital gray scale can be produced. A very accurate gray scale can be created.

As an example, a liquid crystal electro-optical device having 256,000 TFTs forming 640×400 dots was fabricated. Each TFT was 100 mm square. Using an ordinary nematic liquid crystal, an analog gray scale was created from the electro-optical device. In this case, because of the effects of variations in the characteristics of TFTs, only 16 gray levels can be created at best. However, where a digital gray scale is produced according to the present invention, the electro-optical device is less affected by variations in the characteristics of TFT devices. Therefore, more than 64 gray levels can be created. In color display, amazingly 16,777,216 colors can be realized. That is, subtle color tones can be produced.

What is claimed is:

1. An electro-optical device comprising:

a pair of substrates at least one of which has a pixel electrode thereon;

a liquid crystal material having spontaneous polarization and sandwiched between said substrates;

orienting means provided on surfaces of said substrates which are in contact with said liquid crystal material, said orienting means acting to orient molecules of said liquid crystal along one axis at least at initial stage;

supply means for supplying electric charge to said pixel electrode; and control means for causing said supply means to supply an arbitrary amount of electric charge to said pixel electrode, said arbitrary amount of electric charge being less than twice of product of the spontaneous polarization of said liquid crystal material and pixel area of said pixel electrode, said control means further acting to prevent the amount of electric charge from varying during a time period where said pixel electrode is not selected, thus controlling ratio of area of portions of the liquid crystal material in a first state to area of portions of the liquid crystal material in a second state to thereby produce a gray scale.

2. The device of claim 1 wherein reverse electric charge is supplied before supply of said arbitrary amount of electric charge to previously align the liquid crystal molecules in one direction.

3. The device of claim 1 wherein said supply means comprises a thin-film transistor connected with said pixel electrode.

4. The device of claim 3 wherein a capacitor is connected in parallel with said pixel electrode.

5. The device of claim 1 wherein said supply means comprises a diode device.

6. The device of claim 1 wherein said supply means comprises a ferroelectric film.

7. An electro-optical device comprising:

a pair of substrates at least one of which has a pixel electrode thereon;

a liquid crystal material having spontaneous polarization and sandwiched between said substrates;

orienting means provided on surfaces of said substrates which are in contact with said liquid crystal material, said orienting means acting to orient molecules of said liquid crystal along one axis at least at initial stage;

supply means for supplying electric charge to said pixel electrode; and control means for causing said supply means to supply an arbitrary amount of electric charge to said pixel electrode, said arbitrary amount of electric charge being less than twice of product of the spontaneous polarization of said liquid crystal material and pixel area of said pixel electrode, said control means further acting to prevent the amount of electric charge from varying until next supply of electric charge to said pixel electrode, thus inverting spontaneous polarization corresponding to the supplied electric charge so as to maintain the supplied electric charge and spontaneous polarization charge inside the pixel electrode in a substantially equilibrium state, whereby controlling ratio of area of portions of the liquid crystal material in a first state to area of portions of the liquid crystal material in a second state to thereby produce a gray scale.

8. The device of claim 7 wherein reverse electric charge is supplied before supply of said arbitrary amount of electric charge to previously align the liquid crystal molecules in one direction.

9. The device of claim 7 wherein said supply means comprises a thin-film transistor connected with said pixel electrode.

10. The device of claim 9 wherein a capacitor is connected in parallel with said pixel electrode.

* * * * *